United States Patent
Liu et al.

(10) Patent No.: US 12,021,390 B2
(45) Date of Patent: Jun. 25, 2024

(54) POWER COORDINATION METHOD FOR PHOTOVOLTAIC STATION AND STATION

(71) Applicant: Huawei Digital Power Technologies Co., Ltd., Guangdong (CN)

(72) Inventors: Min Liu, Shenzhen (CN); Shuchao Wang, Shanghai (CN); Yao Chang, Beijing (CN); Song Wan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/145,830

(22) Filed: Dec. 22, 2022

(65) Prior Publication Data

US 2023/0208147 A1  Jun. 29, 2023

Related U.S. Application Data

(63) Continuation of application No. PCT/CN2020/097571, filed on Jun. 23, 2020.

(51) Int. Cl.
*H02J 3/46* (2006.01)

(52) U.S. Cl.
CPC ........... *H02J 3/466* (2020.01); *H02J 2300/26* (2020.01)

(58) Field of Classification Search
CPC ..................................................... H02J 3/381
See application file for complete search history.

(56) References Cited

U.S. PATENT DOCUMENTS

| 2018/0138823 A1* | 5/2018 | Garrity ................... H02J 3/38 |
| 2020/0014212 A1 | 1/2020 | Mousavi |
| 2020/0169219 A1 | 5/2020 | Zhang et al. |

(Continued)

FOREIGN PATENT DOCUMENTS

| CN | 104362648 A | 2/2015 |
| CN | 104901340 A | 9/2015 |
| CN | 105048479 A | 11/2015 |

(Continued)

*Primary Examiner* — Daniel Kessie
(74) *Attorney, Agent, or Firm* — Gregg Jansen

(57) ABSTRACT

This application discloses a photovoltaic station and a power coordination method for a photovoltaic station. Sample inverters are disposed in arrays requiring power adjustment in the photovoltaic station. Real-time active power of sample inverters in each array is obtained. Then, an available active capacity and an available reactive capacity of the array and available active capacities and available reactive capacities of all the arrays requiring power adjustment are obtained based on the real-time active power of the sample inverters. Finally, active power and reactive power of the photovoltaic station are separately allocated to the N arrays based on the available active capacities and the available reactive capacities respectively corresponding to the N arrays. Because the sample inverters come from the arrays requiring power adjustment, differences between inverters and differences between the arrays can be fully exploited, and the available active capacities of the arrays can be more accurately obtained by using the sample inverters. Therefore, a more accurate available power capacity of the photovoltaic station is obtained by using relatively accurate available active capacities.

32 Claims, 17 Drawing Sheets

(56) References Cited

U.S. PATENT DOCUMENTS

2020/0212682 A1* 7/2020 Mitsugi .................... H02J 3/46

FOREIGN PATENT DOCUMENTS

| CN | 105244923 A | 1/2016 |
| CN | 109149662 A | 1/2019 |
| CN | 110034584 A | 7/2019 |
| JP | 2010213542 A | 9/2010 |

* cited by examiner

POWER COORDINATION METHOD FOR PHOTOVOLTAIC STATION AND STATION

CROSS-REFERENCE TO RELATED APPLICATIONS

This application is a continuation of International Application No. PCT/CN2020/097571, filed on Jun. 23, 2020, the disclosure of which is hereby incorporated by reference in its entirety.

TECHNICAL FIELD

This application relates to the field of power electronic technologies, and in particular, to a power coordination method for a photovoltaic station and a station.

BACKGROUND

The photovoltaic station is usually connected to a grid to transmit solar photovoltaic power to the grid. The photovoltaic station usually includes a plurality of solar cell arrays, arrays for short in the following. Each array includes a plurality of inverters. The inverter converts a direct current of a solar panel into an alternating current.

The photovoltaic station can adjust power of the arrays (the power includes reactive power and active power). Currently, to obtain an available power capacity of the photovoltaic station, one or more arrays in the photovoltaic station are usually set to sample arrays. The sample array works in a natural maximum power generation mode, that is, the sample array does not participate in power adjustment of the photovoltaic station. An available power capacity of the sample array is obtained by using available power of all inverters in the sample array. Finally, because it is assumed that power generation statuses of other matrices in the photovoltaic station are basically the same as a power generation status of the sample matrix, the available power capacity of the photovoltaic station can be obtained based on the available power capacity of the sample array.

FIG. 1 is a diagram of a photovoltaic station.

For ease of understanding, in FIG. 1, an example in which the photovoltaic station includes three arrays, namely, a first array 100, a second array 200, and a third array 300, is used for description. The second array 200 is a sample array. Descriptions are provided by using an example in which the second array 200 includes six inverters (an inverter 201 to an inverter 206). Actually, more inverters may be included. Referring to FIG. 2, an available power capacity of the second array 200 is obtained by using available power of the six inverters. Because the photovoltaic station has three arrays, an available power capacity of the photovoltaic station can be obtained only by multiplying the available power capacity of the second array 200 by 3.

However, in the foregoing case in which the sample array represents all the arrays in the photovoltaic station, differences between the arrays are ignored, causing a relatively large deviation between the obtained available power capacity and an actual available power capacity. Therefore, in the conventional technology, accuracy of a manner in which an available power capacity of a photovoltaic station is obtained by using a sample array and then active power adjustment and reactive power adjustment are performed based on the available power capacity is relatively low.

SUMMARY

This application provides a power coordination method for a photovoltaic station and a station, to improve accuracy of active power adjustment and reactive power adjustment.

According to a first aspect, an embodiment of this application provides a power coordination method for a photovoltaic station. The photovoltaic station includes M arrays. N arrays in the M arrays require power coordination. The array requiring power adjustment includes n normally-running inverters. For example, for any array, s inverters are selected from normal-running inverters as sample inverters. Real-time active power of the s sample inverters are obtained. Then, an available active capacity of the array is obtained based on the real-time active power of the s sample inverters, and an available reactive capacity of the array is obtained based on the real-time active power of the s sample inverters. By analogy, available active capacities and available reactive capacities of all the arrays requiring power adjustment are obtained. Finally, active power of the photovoltaic station is allocated to the N arrays based on the available active capacities respectively corresponding to the N arrays, and reactive power of the photovoltaic station is allocated to the N arrays based on the available reactive capacities respectively corresponding to the N arrays.

In the method, an available power capacity of the photovoltaic station is not obtained based on available active capacities of all inverters in only one sample array any more. Instead, sample inverters are disposed in all the arrays requiring power adjustment, that is, sample inverters are distributed in each array requiring power adjustment, and the sample inverters are not concentrated in one array any more. Because the sample inverters come from the arrays requiring power adjustment, differences between inverters and differences between the arrays can be fully exploited, and the available active capacities of the arrays can be more accurately obtained by using the sample inverters. Therefore, a more accurate available power capacity of the photovoltaic station is obtained by using relatively accurate available active capacities.

Optionally, real-time active power of any array may be obtained by using average active power. The average active power of a $j^{th}$ array is obtained based on real-time active power of s sample inverters; and an available active capacity of the $j^{th}$ array is obtained based on the average active power of the $j^{th}$ array and n.

Optionally, real-time reactive power of the any array may be obtained by using the real-time active power. An available reactive capacity of the $j^{th}$ array is obtained based on the real-time active power of the s sample inverters, maximum apparent power of the sample inverter, and n.

In an embodiment, the photovoltaic station obtains the available active capacities and the available reactive capacities of the arrays by using the sample inverters, and allocates available active capacities and available reactive capacities to the corresponding arrays based on target active power and target reactive power of the station and priorities of the arrays, to differentially coordinate available power capacities of the arrays.

First, the active power is allocated to the arrays. The active power is allocated to the N arrays based on the target active power of the station, the priorities of the N arrays, and the available active capacities respectively corresponding to the N arrays.

Optionally, after the active power is allocated to the arrays, the reactive power may be further allocated to the arrays. In a manner, the reactive power is allocated to the N arrays based on the target reactive power of the station, the priorities of the N arrays, and the available reactive capacities respectively corresponding to the N arrays.

In an embodiment, the available reactive capacities are first adjusted, and then the available active capacities are adjusted, so that when the available reactive capacities of the arrays are less than the target reactive power of the station, available active capacities of some arrays can be scarified to enable the available reactive capacities to reach the target reactive power of the station, thereby reducing energy consumption, improving grid voltage quality, reducing a penalty, and increasing a revenue.

A manner of allocating the reactive power to the arrays is as follows: The N arrays include at least the following arrays of two priorities: arrays of a first priority and arrays of a second priority, where the first priority is higher than the second priority; and when a total available reactive capacity of the N arrays is greater than or equal to the target reactive power, and a total available reactive capacity of the arrays of the first priority is greater than or equal to the target reactive power, the target reactive power is allocated to the arrays of the first priority based on ratios of available reactive capacities of the arrays to the total available reactive capacity of the arrays of the first priority.

Optionally, another manner of allocating the reactive power to the arrays is as follows: The N arrays include at least the following arrays of two priorities: arrays of a first priority and arrays of a second priority, where the first priority is higher than the second priority; and when a total available reactive capacity of the N arrays is greater than or equal to the target reactive power, and a total available reactive capacity of the arrays of the first priority is less than the target reactive power, full-amount allocation is performed on the arrays of the first priority based on available reactive capacities of the arrays, and reactive power that is of the target reactive power and that remains after allocation is performed on the first priority is allocated to the arrays of the second priority based on ratios of available reactive capacities of the arrays to a total available reactive capacity of the arrays of the second priority.

Optionally, after the reactive power is allocated, active power of the arrays may change. Therefore, active power may be newly allocated to the arrays. In a manner, when a total available active capacity of the N arrays is greater than or equal to the target active power, and a total available active capacity of the arrays of the first priority is greater than or equal to the target active power, the target active power is allocated to the arrays of the first priority based on ratios of available active capacities of the arrays to the total available active capacity of the arrays of the first priority.

Optionally, another manner of newly allocating the active power is as follows: When a total available active capacity of the N arrays is greater than or equal to the target active power, and a total available active capacity of the arrays of the first priority is less than the target active power, full-amount allocation is performed on the arrays of the first priority based on available active capacities of the arrays, and active power that is of the target active power and that remains after allocation is performed on the first priority is allocated to the arrays of the second priority based on ratios of available active capacities of the arrays to a total available active capacity of the arrays of the second priority.

Optionally, still another manner of newly allocating the active power is as follows: When a total available active capacity of the N arrays is less than the target active power, full-amount allocation is performed based on the available active capacities respectively corresponding to the N arrays.

In an embodiment, still another manner of allocating the reactive power to the arrays is as follows: When a total available reactive capacity of the N arrays is less than the target reactive power, full-amount allocation is first performed based on the available reactive capacities respectively corresponding to the N arrays, and then reactive power is allocated in descending order of power factors of the N arrays, until all the target reactive power is allocated.

Optionally, after the reactive power is allocated, active power of the arrays may change. Therefore, active power may be newly allocated to the arrays. In a manner, an updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is greater than or equal to the target active power, and an updated total available active capacity of the arrays of the first priority is greater than or equal to the target active power, the target active power is allocated to the arrays of the first priority based on ratios of updated available active capacities of the arrays to the updated total available active capacity of the arrays of the first priority.

Optionally, another manner of newly allocating the active power is as follows: An updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is greater than or equal to the target active power, and an updated total available active capacity of the arrays of the first priority is less than the target active power, full-amount allocation is performed on the arrays of the first priority based on updated available active capacities of the arrays, and active power that is of the target active power and that remains after allocation is performed on the first priority is allocated to the arrays of the second priority based on ratios of updated available active capacities of the arrays to an updated total available active capacity of the arrays of the second priority.

Optionally, still another manner of newly allocating the active power is as follows: An updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is less than the target active power, full-amount allocation is performed based on updated available active capacities respectively corresponding to the N arrays.

In an embodiment, when the arrays in the photovoltaic station have a same priority, in other words, when the arrays in the photovoltaic station have no priorities, the active power may be first allocated to the arrays, and then the reactive power may be allocated to the arrays.

A manner of first allocating the active power to the arrays is as follows: When a total available active capacity of the N arrays is greater than or equal to target active power, the target active power is allocated to the N arrays based on ratios of the available active capacities of the arrays to the total available active capacity of the N arrays; or when a total available active capacity of the N arrays is less than the target active power, full-amount allocation is performed based on the available active capacities respectively corresponding to the N arrays.

Optionally, after the active power is allocated, the reactive power may be allocated to the arrays. In a manner, when a total available reactive capacity of the N arrays is greater than or equal to target reactive power, the target reactive power is allocated to the N arrays based on ratios of the available reactive capacities of the arrays to the total available reactive capacity of the N arrays; or when a total available reactive capacity of the N arrays is less than the target reactive power, full-amount allocation is performed based on the available reactive capacities respectively corresponding to the N arrays.

In an embodiment, when the arrays in the photovoltaic station have a same priority, in other words, when the arrays in the photovoltaic station have no priorities, the reactive power may be first allocated to the arrays. In a manner, when a total available reactive capacity of the N arrays is less than target reactive power, full-amount allocation is first performed based on the available reactive capacities respectively corresponding to the N arrays, and then reactive power is allocated in descending order of power factors of the N arrays, until all the target reactive power is allocated, where allocated reactive power of each of the N arrays is less than or equal to maximum apparent power of the array; or when a total available reactive capacity of the N arrays is greater than or equal to the target reactive power, the target active power is allocated to the N arrays based on ratios of the available reactive capacities of the arrays to the total available reactive capacity of the N arrays.

In an embodiment, after the active power and/or the reactive power are/is allocated to the arrays, inverter power allocation is dynamically adjusted, to increase an electric energy yield, fully utilize the available active capacities and the available reactive capacities of the arrays, and maximize a power range. A manner of allocating reactive power to the inverter in the array is as follows: When available reactive power of the $j^{th}$ array is greater than or equal to the allocated reactive power of the $j^{th}$ array, reactive power is allocated to an $i^{th}$ inverter in the $j^{th}$ array based on a ratio of an available reactive capacity of the $i^{th}$ inverter to a total available reactive capacity of the $j^{th}$ array, where i=1, 2, ..., n.

In an embodiment, after the active power and/or the reactive power are/is allocated to the arrays, inverter power allocation is dynamically adjusted, to increase an electric energy yield, fully utilize the available active capacities and the available reactive capacities of the arrays, and maximize a power range. A manner of allocating active power to the inverter in the array is as follows: When available active power of the $j^{th}$ array is greater than or equal to allocated active power of the $j^{th}$ array, active power is allocated to the $i^{th}$ inverter in the $j^{th}$ array based on a ratio of an available active capacity of the it h inverter to a total available active capacity of the $j^{th}$ array, where i=1, 2, ..., n.

According to a second aspect, an embodiment of this application provides a photovoltaic station. All the foregoing power coordination methods for the photovoltaic station can be applied to the photovoltaic station provided in this embodiment of this application. The photovoltaic station includes a station controller and M arrays. N arrays in the M arrays require power coordination; a $j^{th}$ array in the N arrays includes n normally-running inverters, and j=1, 2, ..., N; the n inverters include s sample inverters; and both M and N are positive integers, N is less than or equal to M, both n and s are positive integers, and s is less than n. The station controller allocates active power to the N arrays based on available active capacities respectively corresponding to the N arrays, where an available active capacity of the $j^{th}$ array in the N arrays is obtained based on real-time active power of the s sample inverters; and allocates reactive power to the N arrays based on available reactive capacities respectively corresponding to the N arrays, where an available reactive capacity of the $j^{th}$ array in the N arrays is obtained based on the real-time active power of the s sample inverters.

Sample inverters are deployed in each array requiring power coordination, and sample inverters are not concentrated in one sample array any more, but distributed in the arrays requiring power coordination in the photovoltaic station. Compared with obtaining available active capacities based on a sample array, in this embodiment of this application, the sample inverters are more evenly and widely distributed, and obtained available active capacities are more accurate, that is, the sample inverter is more representative than the sample array. Because the sample inverters come from the arrays requiring power adjustment, differences between inverters and differences between the arrays can be fully exploited, and the available active capacities of the arrays can be more accurately obtained by using the sample inverters. Therefore, a more accurate available power capacity of the photovoltaic station is obtained by using relatively accurate available active capacities.

In an embodiment, the photovoltaic station includes not only the station controller, but also an array controller. The station controller obtains available power capacities of the arrays by using the array controller, and allocates the active power and the reactive power to the corresponding arrays based on target active power and target reactive power of the station and priorities of the arrays, to differentially coordinate power of the arrays.

The array controller obtains average active power of the $j^{th}$ array based on the real-time active power of the s sample inverters; and obtains the available active capacity of the $i^{th}$ array based on the average active power of the $j^{th}$ array and n.

The array controller obtains the available reactive capacity of the $j^{th}$ array based on the real-time active power of the s sample inverters, maximum apparent power of the sample inverter, and n.

In an embodiment, the photovoltaic station obtains the available active capacities and the available reactive capacities of the arrays by using the sample inverters, and allocates available active capacities and available reactive capacities to the corresponding arrays based on the target active power and the target reactive power of the station and the priorities of the arrays, to differentially coordinate the available power capacities of the arrays.

First, the station controller first allocates the active power to the arrays. The station controller allocates the active power to the N arrays based on the target active power of the station, the priorities of the N arrays, and the available active capacities respectively corresponding to the N arrays.

Optionally, after allocating the active power to the arrays, the station controller may further allocate the reactive power to the arrays. In a manner, the station controller allocates the reactive power to the N arrays based on the target reactive power of the station, the priorities of the N arrays, and the available reactive capacities respectively corresponding to the N arrays.

In an embodiment, the station controller first adjusts the available reactive capacities, and then adjusts the available active capacities, so that when the available reactive capacities of the arrays are less than the target reactive power of the station, available active capacities of some arrays can be scarified to enable the available reactive capacities to reach the target reactive power of the station, thereby reducing energy consumption, improving grid voltage quality, reducing a penalty, and increasing a revenue.

A manner in which the station controller allocates the reactive power to the arrays is as follows: The N arrays include at least the following arrays of two priorities: arrays of a first priority and arrays of a second priority, where the first priority is higher than the second priority; and when a total available reactive capacity of the N arrays is greater than or equal to the target reactive power, and a total available reactive capacity of the arrays of the first priority is greater than or equal to the target reactive power, the station controller allocates the target reactive power to the arrays of the first priority based on ratios of available reactive capacities of the arrays to the total available reactive capacity of the arrays of the first priority.

Optionally, another manner in which the station controller allocates the reactive power to the arrays is as follows: The N arrays include at least the following arrays of two priorities: arrays of a first priority and arrays of a second priority, where the first priority is higher than the second priority; and when a total available reactive capacity of the N arrays is greater than or equal to the target reactive power, and a total available reactive capacity of the arrays of the first priority is less than the target reactive power, full-amount allocation is performed on the arrays of the first priority based on available reactive capacities of the arrays, and reactive power that is of the target reactive power and that remains after allocation is performed on the first priority is allocated to the arrays of the second priority based on ratios of available reactive capacities of the arrays to a total available reactive capacity of the arrays of the second priority.

Optionally, after the station controller allocates the reactive power, active power of the arrays may change. Therefore, the station controller may newly allocate active power to the arrays. In a manner, when a total available active capacity of the N arrays is greater than or equal to the target active power, and a total available active capacity of the arrays of the first priority is greater than or equal to the target active power, the target active power is allocated to the arrays of the first priority based on ratios of available active capacities of the arrays to the total available active capacity of the arrays of the first priority.

Optionally, another manner in which the station controller newly allocates the active power to the arrays is as follows: When a total available active capacity of the N arrays is greater than or equal to the target active power, and a total available active capacity of the arrays of the first priority is less than the target active power, full-amount allocation is performed on the arrays of the first priority based on available active capacities of the arrays, and active power that is of the target active power and that remains after allocation is performed on the first priority is allocated to the arrays of the second priority based on ratios of available active capacities of the arrays to a total available active capacity of the arrays of the second priority.

Optionally, still another manner in which the station controller newly allocates the active power to the arrays is as follows: When a total available active capacity of the N arrays is less than the target active power, full-amount allocation is performed based on the available active capacities respectively corresponding to the N arrays.

In an embodiment, still another manner in which the station controller allocates the reactive power to the arrays is as follows: When a total available reactive capacity of the N arrays is less than the target reactive power, full-amount allocation is first performed based on the available reactive capacities respectively corresponding to the N arrays, and then reactive power is allocated in descending order of power factors of the N arrays, until all the target reactive power is allocated.

Optionally, after the station controller allocates the reactive power, active power of the arrays may change. Therefore, active power may be newly allocated to the arrays. In a manner, an updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is greater than or equal to the target active power, and an updated total available active capacity of the arrays of the first priority is greater than or equal to the target active power, the target active power is allocated to the arrays of the first priority based on ratios of updated available active capacities of the arrays to the updated total available active capacity of the arrays of the first priority.

Optionally, another manner in which the station controller newly allocates the active power to the arrays is as follows: An updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is greater than or equal to the target active power, and an updated total available active capacity of the arrays of the first priority is less than the target active power, full-amount allocation is performed on the arrays of the first priority based on updated available active capacities of the arrays, and active power that is of the target active power and that remains after allocation is performed on the first priority is allocated to the arrays of the second priority based on ratios of updated available active capacities of the arrays to an updated total available active capacity of the arrays of the second priority.

Optionally, still another manner in which the station controller newly allocates the active power to the arrays is as follows: An updated available active capacity of the $j^{th}$ array is obtained based on allocated reactive power of the $j^{th}$ array in the N arrays and maximum apparent power of the $j^{th}$ array; the N arrays include at least the following arrays of two priorities: arrays of a first priority and arrays of a second priority, where the first priority is higher than the second priority; and when an updated total available active capacity of the N arrays is less than the target active power, full-amount allocation is performed based on updated available active capacities respectively corresponding to the N arrays.

In an embodiment, when the arrays in the photovoltaic station have a same priority, in other words, when the arrays in the photovoltaic station have no priorities, the active power may be first allocated to the arrays, and then the reactive power may be allocated to the arrays.

A manner in which the station controller first allocates the active power to the arrays is as follows: When a total available active capacity of the N arrays is greater than or equal to target active power, the target active power is allocated to the N arrays based on ratios of the available active capacities of the arrays to the total available active capacity of the N arrays; or when a total available active capacity of the N arrays is less than the target active power, full-amount allocation is performed based on the available active capacities respectively corresponding to the N arrays.

Optionally, after allocating the active power, the station controller may allocate the reactive power to the arrays. In a manner, when a total available reactive capacity of the N arrays is greater than or equal to target reactive power, the target reactive power is allocated to the N arrays based on ratios of the available reactive capacities of the arrays to the total available reactive capacity of the N arrays; or when a total available reactive capacity of the N arrays is less than the target reactive power, full-amount allocation is performed based on the available reactive capacities respectively corresponding to the N arrays.

In an embodiment, when the arrays in the photovoltaic station have a same priority, in other words, when the arrays in the photovoltaic station have no priorities, the station controller may first allocate the reactive power to the arrays. In a manner, when a total available reactive capacity of the N arrays is less than target reactive power, full-amount allocation is first performed based on the available reactive capacities respectively corresponding to the N arrays, and then reactive power is allocated in descending order of power factors of the N arrays, until all the target reactive power is allocated, where allocated reactive power of each of the N arrays is less than or equal to maximum apparent power of the array; or when a total available reactive capacity of the N arrays is greater than or equal to the target reactive power, the target active power is allocated to the N arrays based on ratios of the available reactive capacities of the arrays to the total available reactive capacity of the N arrays.

In an embodiment, after the station controller allocates the active power and/or the reactive power to the arrays, the array controller dynamically adjusts inverter power allocation, to increase an electric energy yield, fully utilize the available active capacities and the available reactive capacities of the arrays, and maximize a power range. A manner in which the array controller allocates reactive power to an inverter in the array is as follows: When available reactive power of the $j^{th}$ array is greater than or equal to the allocated reactive power of the $j^{th}$ array, reactive power is allocated to an $i^{th}$ inverter in the $j^{th}$ array based on a ratio of an available reactive capacity of the $i^{th}$ inverter to a total available reactive capacity of the $j^{th}$ array, where i=1, 2, ..., n.

In an embodiment, after the station controller allocates the active power and/or the reactive power to the arrays, the array controller dynamically adjusts inverter power allocation, to increase an electric energy yield, fully utilize the available active capacities and the available reactive capacities of the arrays, and maximize a power range. A manner of allocating active power to the inverter in the array is as follows: When available active power of the $j^{th}$ array is greater than or equal to allocated active power of the $j^{th}$ array, the array controller allocates active power to the $i^{th}$ inverter in the $j^{th}$ array based on a ratio of an available active capacity of the $i^{th}$ inverter to a total available active capacity of the $j^{th}$ array, where i=1, 2, ..., n.

According to the foregoing technical solutions, it can be learned that embodiments of this application have the following advantages:

All the arrays requiring power coordination are used as samples. For example, for any array requiring power adjustment, s inverters are selected from the array as sample inverters. Real-time active power of the s sample inverters are obtained. Then, an available active capacity of the array is obtained based on the real-time active power of the s sample inverters, and an available reactive capacity of the array is obtained based on the real-time active power of the s sample inverters. By analogy, the available active capacities and the available reactive capacities of all the arrays requiring power adjustment are obtained. Finally, the active power of the photovoltaic station is allocated to the N arrays based on the available active capacities respectively corresponding to the N arrays, and the reactive power of the photovoltaic station is allocated to the N arrays based on the available reactive capacities respectively corresponding to the N arrays.

In the method, an available power capacity of the photovoltaic station is not obtained based on available active capacities of all inverters in only one sample array any more. Instead, sample inverters are disposed in all the arrays requiring power adjustment, that is, sample inverters are distributed in each array requiring power adjustment, and the sample inverters are not concentrated in one array any more. Because the sample inverters come from the arrays requiring power adjustment, differences between inverters and differences between the arrays can be fully exploited, and the available active capacities of the arrays can be more accurately obtained by using the sample inverters. Therefore, a more accurate available power capacity of the photovoltaic station is obtained by using relatively accurate available active capacities.

DESCRIPTION OF EMBODIMENTS

To make a person skilled in the art better understand technical solutions provided in embodiments of this application, the following clearly describes the technical solutions in embodiments of this application with reference to accompanying drawings in the embodiments.

Embodiment 1 is of a Power Coordination Method for a Photovoltaic Station

To improve power allocation accuracy of the photovoltaic station, in this embodiment of this application, sample inverters are disposed in arrays. That is, available power capacities of the arrays are obtained based on real-time active power of the sample inverters.

The following describes embodiments provided in this application with reference to accompanying drawings.

Figure 1:
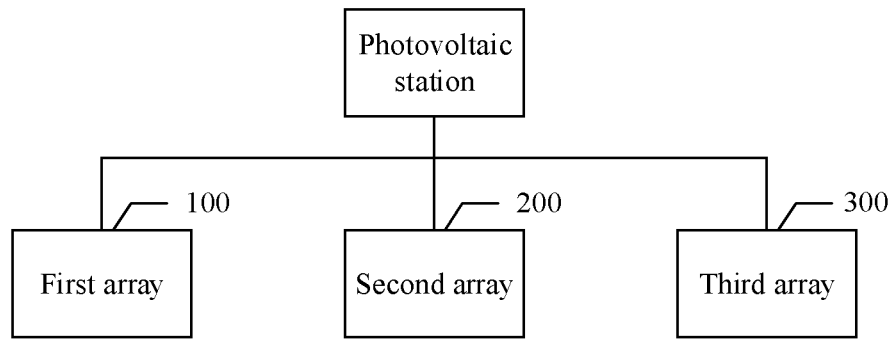
FIG. 1 is a diagram of a photovoltaic station.
Figure 2:
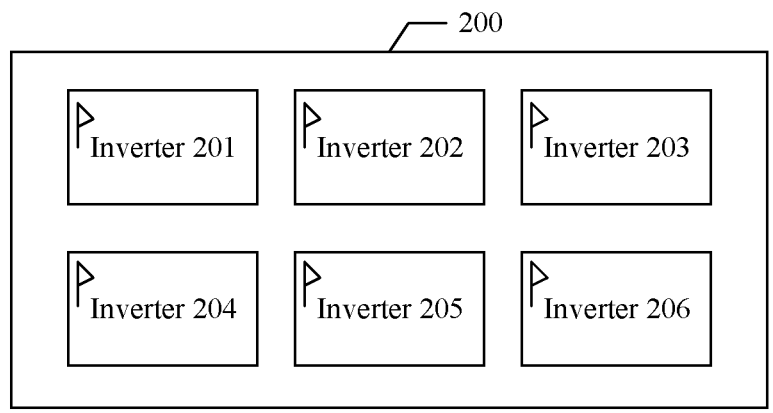
FIG. 2 is a diagram of inverters in a sample array.
Figure 3:
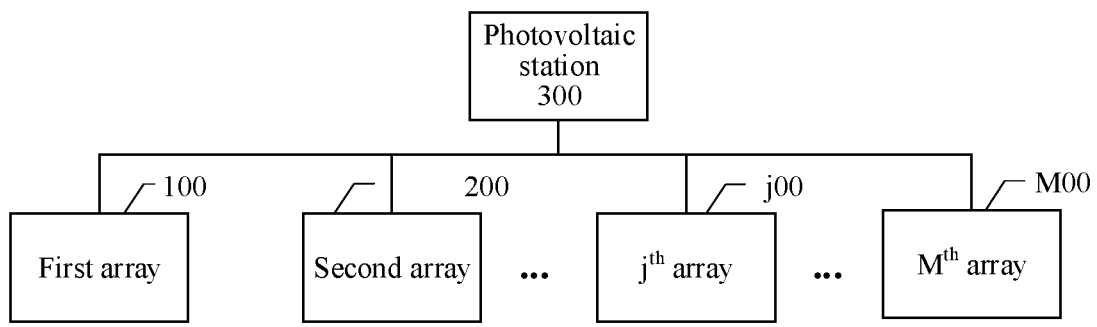
FIG. 3 is a diagram of a photovoltaic station according to an embodiment of this application.

FIG. 3 is a diagram of a photovoltaic station 300 according to an embodiment of this application.

The photovoltaic station 300 provided in this application includes M arrays: a first array 100, a second array 200, . . . , and a $M^{th}$ array M00. The M arrays have N arrays requiring power coordination. In this embodiment of this application, a quantity of arrays in the photovoltaic station 300 is not limited, and a quantity of arrays requiring power coordination is also not limited, that is, both M and N are positive integers. The arrays requiring coordination may be all the arrays or some arrays in the photovoltaic station 300, that is, N is less than or equal to M.

Each array includes a plurality of inverters. In this embodiment of this application, a quantity of inverters in the array is not limited, and a running status of the inverter is also not limited. For example, inverters in the array may be partially faulty or may all normally work, but all selected sample inverters are normally-working inverters.

For ease of description, the following provides detailed descriptions by using any array, a $j^{th}$ array j00, requiring power adjustment as an example, where j=1, 2, . . . , N.

The $j^{th}$ array includes n normally-running inverters, and n is a positive integer. s sample inverters are set in the n normally-running inverters. The sample inverter is always in a natural maximum power generation state, that is, an available power capacity of the sample inverter is neither restricted nor controlled, and the sample inverter does not participate in power adjustment.

A quantity of sample inverters is not limited in this embodiment of this application, that is, s is a positive integer, and s is less than n. For example, a value range of the quantity of sample inverters is 5% n≤s≤15% n. A person skilled in the art may set the quantity of sample inverters based on an actual requirement. A larger quantity of sample inverters indicates a more accurate obtained available power capacity. However, a larger quantity of sample inverters causes an increase in calculation complexity, and the quantity of sample inverters may be selected based on calculation complexity and accuracy.

In order that a person skilled in the art better understands the technical solutions provided in this embodiment, the following provides detailed descriptions by using an example in which the $j^{th}$ array includes nine inverters.

Figure 4A:
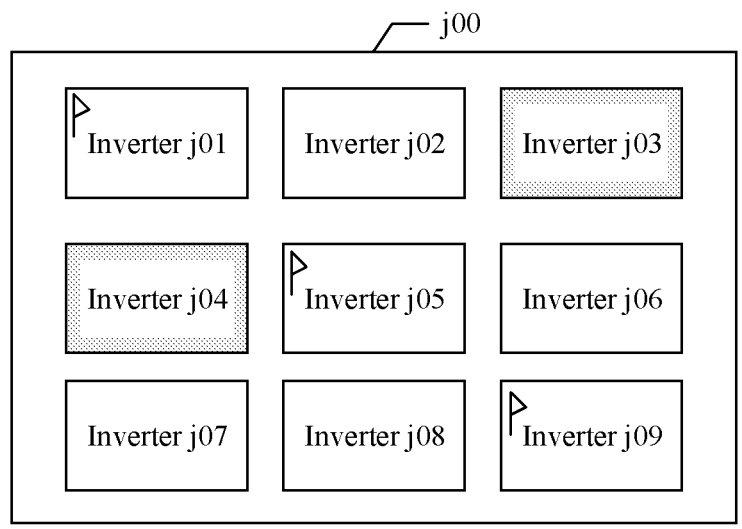
FIG. 4A is a diagram in which a $j^{th}$ array includes nine inverters according to an embodiment of this application.

FIG. 4A is a diagram in which a $j^{th}$ array includes nine inverters according to an embodiment of this application.

The $j^{th}$ array j00 includes nine inverters: an inverter j01, an inverter j02, an inverter j03, an inverter j04, an inverter j05, an inverter j06, an inverter j07, an inverter j08, and an inverter j09. The inverter j03 and the inverter j04 are faulty inverters, that is, the $j^{th}$ array includes seven normally-running inverters, and n=7. In the seven normally-running inverters, three inverters, namely, the inverter j01, the inverter j05, and the inverter j09, are set to sample inverters, that is, s=3.

Sample inverters are deployed in each array requiring power coordination, and sample inverters are not concentrated in one sample array any more, but distributed in the arrays requiring power coordination in the photovoltaic station 300. Compared with obtaining available active capacities based on a sample array, in this embodiment of this application, the sample inverters are more evenly and widely distributed, and obtained available active capacities are more accurate, that is, the sample inverter is more representative than the sample array. Because the sample inverters come from the arrays requiring power adjustment, differences between inverters and differences between the arrays can be fully exploited, and available active capacities of the arrays can be more accurately obtained by using the sample inverters. Therefore, a more accurate available power capacity of the photovoltaic station 300 is obtained by using relatively accurate available active capacities.

According to the power coordination method for the photovoltaic station 300 provided in this embodiment of this application, the available power capacities of the arrays or inverter power can be dynamically adjusted through continuous cyclical adjustment. For ease of description, the following provides descriptions by using adjusting the available power capacities of the arrays or the inverter power once as an example.

The following describes, with reference to accompanying drawings, a method for coordinating power based on a sample inverter in this embodiment of this application.

Figure 5:
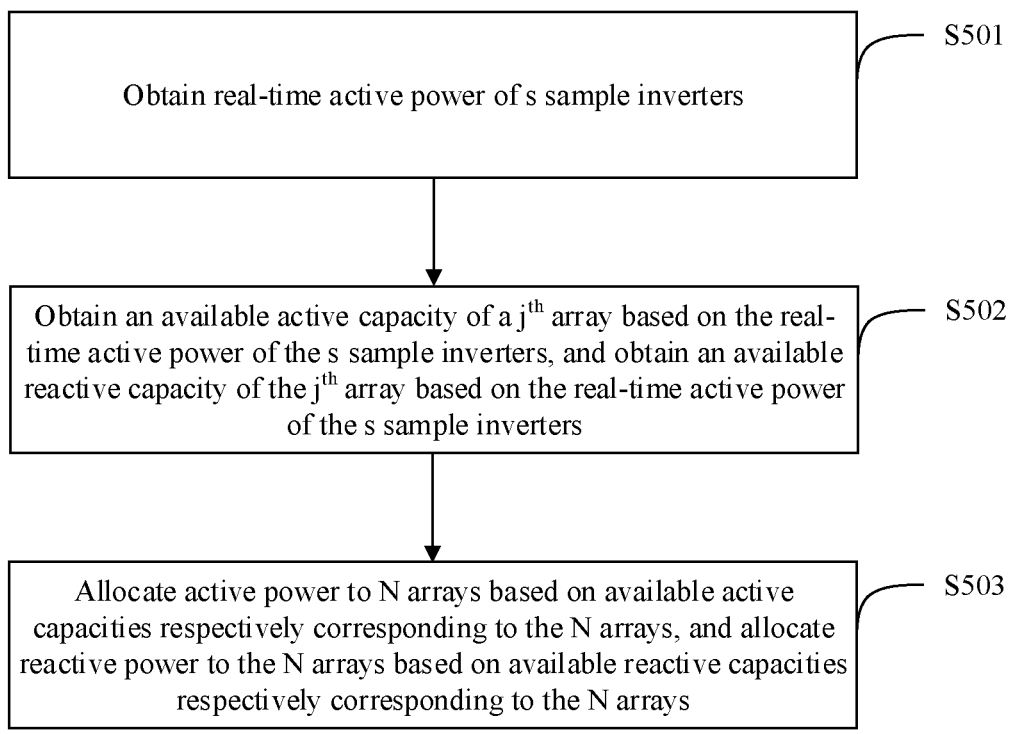
FIG. 5 is a flowchart of a power coordination method for a photovoltaic station according to an embodiment of this application.

FIG. 5 is a flowchart of a power coordination method for a photovoltaic station according to an embodiment of this application.

S501: Obtain real-time active power of s sample inverters.

An available active capacity of an array is affected by an illumination condition. The available active capacity of the array increases with strengthening of illumination, and the available active capacity of the array decreases with weakening of illumination, that is, the available active capacity of the array is changing. To obtain an available power capacity of the photovoltaic station 300 based on sample inverters, real-time active power of the sample inverters need to be first obtained.

The photovoltaic station 300 may indirectly obtain status information of sample inverters in arrays by using array controllers, or may directly obtain the status information of the sample inverters in the arrays. A manner in which the photovoltaic station 300 obtains the status information of the sample inverters is not limited in this embodiment of this application. The status information of the sample inverters include at least the real-time active power of the sample inverters.

The photovoltaic station 300 may further directly or indirectly obtain quantities of sample inverters included in the arrays. Whether the arrays include a same quantity of sample inverters is not limited in this embodiment of this application. For example, a quantity of sample inverters included in a $j^{th}$ array is different from a quantity of sample inverters included in a $(j+1)^{th}$ array. For another example, all of the N arrays include a same quantity of sample inverters.

A manner in which the photovoltaic station 300 obtains the status information of the sample inverters and the quantities of sample inverters is not limited in this embodiment of this application. For example, the photovoltaic station 300 may obtain the status information of the sample inverters and the quantities of sample inverters in real time or at a preset time interval. A length of the preset time interval is not limited in this embodiment of this application. For example, the preset time may be any value in 30 seconds to 5 minutes.

S502: Obtain an available active capacity of a $j^{th}$ array based on the real-time active power of the s sample inverters, and obtain an available reactive capacity of the $j^{th}$ array based on the real-time active power of the s sample inverters.

The $j^{th}$ array includes the s sample inverters, and the available active capacity of the $j^{th}$ array is obtained based on the real-time active power of the s sample inverters. Because a sum of a square of active power and a square of reactive power is a square of maximum apparent power, and maximum apparent power of the inverter is fixed, the available reactive capacity of the $j^{th}$ array can be obtained by using the real-time active power of the s sample inverters.

The following provides descriptions by using an example in which an average available active capacity of the $j^{th}$ array is first obtained based on the s sample inverters and then the available active capacity of the $j^{th}$ array and the available reactive capacity of the $j^{th}$ array are obtained.

Whether the sample inverters have a same parameter is not limited in this embodiment of this application. A person skilled in the art may perform adjustment based on an actual status. For example, if the sample inverters have different parameters, a difference between the sample inverters may be adjusted by using a weight. The following provides descriptions by using an example in which the sample inverters have a same parameter.

The average active power of sample inverters in the $j^{th}$ array is obtained based on the real-time active power of the s sample inverters, as shown in the following formula:

$$\overline{P_{si}} = \frac{\sum_{i=1}^{s} P_{si}}{s}, \qquad (1)$$

where $\overline{P_{si}}$ is the average active power of the sample inverters in the $j^{th}$ array, $P_{si}$ is real-time active power of an $i^{th}$ sample inverter, and s is a quantity of sample inverters in the $j^{th}$ array.

The available active capacity of the $j^{th}$ array is obtained based on the average active power of the sample inverters in the array, as shown in the following formula:

$$P_{A-j-max} \cong n \times \overline{P_{si}} \qquad (2),$$ where $P_{A-j-max}$ is the available active capacity of the $j^{th}$ array, $\overline{P_{si}}$ is the average active power of the sample inverters in the $j^{th}$ array, and n is a quantity of normal inverters in the array.

Because the sample inverter is always in a natural maximum power generation state, a quantity of inverters that can be adjusted in the array needs to be obtained by subtracting the quantity of sample inverters and a quantity of faulty inverters from a quantity of all the inverters in the array, that is, by subtracting the quantity of sample inverters from the quantity of normal inverters.

Based on the unchanged maximum apparent power of the inverter, the available reactive capacity of the array is obtained by using the real-time active power of the sample inverters, as shown in the following formula:

$$Q_{A-j-max} \cong (n-s) \times \sqrt[2]{(P_{max})^2 - (\overline{P_{si}})^2}, \qquad (3)$$

where $Q_{A-j-max}$ is the available reactive capacity of the $j^{th}$ array, $P_{max}$ is maximum apparent power of the sample inverter, $\overline{P_{si}}$ is the average active power of the sample inverters in the $j^{th}$ array, n is the quantity of normal inverters in the $j^{th}$ array, and + is the quantity of sample inverters in the $j^{th}$ array.

In addition, the photovoltaic station 300 may include not only the inverters described above, but also optical energy storage elements. A type of the optical energy storage element is not limited in this embodiment of this application. For example, the optical energy storage element may be a power conversion system (PCS).

Figure 4B:
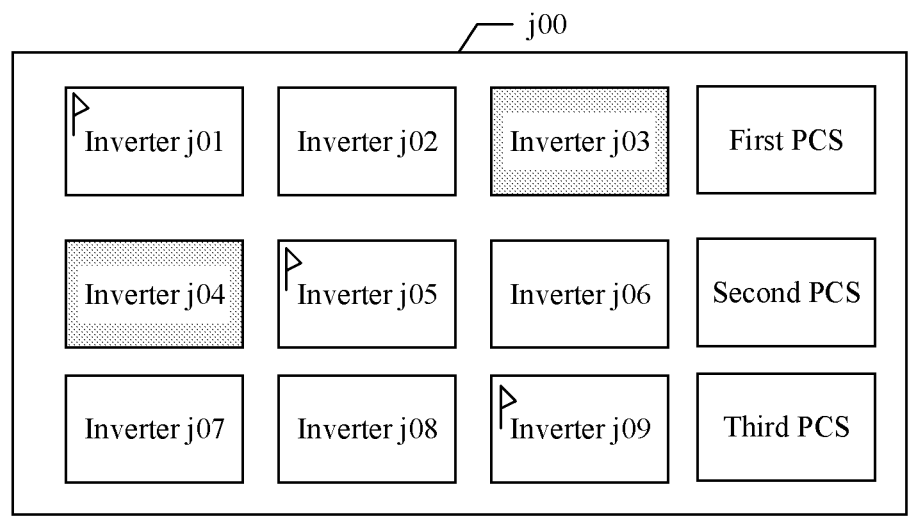
FIG. 4B is a diagram in which a $j^{th}$ array includes nine inverters and three PCSs according to an embodiment of this application.

FIG. 4B is a diagram in which a $j^{th}$ array includes nine inverters and three PCSs according to an embodiment of this application.

Compared with that in FIG. 4A, the $j^{th}$ array j00 further includes three PCSs: a first PCS, a second PCS, and a third PCS.

When the photovoltaic station 300 includes optical energy storage elements, the available reactive capacity of the array is shown in the following formula:

$$Q_{A-j-max} \cong (n-s) \times \sqrt[2]{(P_{max})^2 - (\overline{P_{si}})^2} + Q_{A-j-BESS}, \qquad (4)$$

where $Q_{A-j-max}$ is the available reactive capacity of the $j^{th}$ array, $P_{max}$ is the maximum apparent power of the sample inverter, $\overline{P_{si}}$ is the average active power of the sample inverters in the $j^{th}$ array, $Q_{A-j-BESS}$ is a capacity that is of maximum reactive power and that is obtained when an optical energy storage element in the $j^{th}$ array does not transmit active power, n is the quantity of normal inverters in the $j^{th}$ array, and s is the quantity of sample inverters in the $j^{th}$ array. $Q_{A-j-BESS}$ may be directly obtained from a parameter of the optical energy storage element.

As an embodiment, when the array includes only an optical energy storage element, n=s=0.

Generally, all the arrays in the photovoltaic station 300 have different quantities of optical energy storage elements, and available power capacities of the arrays are obtained based on the sample inverters, to help formulate differential optical storage charging/discharging policies for the arrays, thereby maximizing economic optimization performance of the arrays. In addition, the photovoltaic station 300 can further coordinately allocate optical storage resources of the entire station, to help increase an electric energy yield of the photovoltaic station 300.

S503: Allocate active power to the N arrays based on available active capacities respectively corresponding to the N arrays, and allocate reactive power to the N arrays based on available reactive capacities respectively corresponding to the N arrays.

After the available active capacities of the arrays and the available reactive capacities of the arrays are obtained based on the sample inverters, active power is allocated to each array based on an available active capacity corresponding to the array, and reactive power is allocated to each array based on an available reactive capacity corresponding to the array.

As an embodiment, after obtaining the status information of the sample inverters and the quantities of sample inverters in the arrays, the array controllers obtain the available active capacities of the arrays and the available reactive capacities of the arrays, and transfer the available active capacities of the arrays and the available reactive capacities of the arrays to the photovoltaic station 300, so that the photovoltaic station 300 directly coordinates power based on the available active capacities of the arrays and the available reactive capacities of the arrays.

According to the power coordination method for the photovoltaic station 300 provided in this embodiment of this application, the available power capacity of the photovoltaic station 300 is not obtained based on available active capacities of all inverters in one sample array any more, but the sample inverters are disposed in the arrays requiring power coordination. The sample inverters are not concentrated in one array anymore, but distributed in the arrays requiring power coordination. The sample inverters come from the arrays requiring power adjustment, so that differences between inverters and differences between the arrays can be fully exploited, and the available active capacities of the arrays can be more accurately obtained by using the sample inverters. Therefore, the further obtained available power capacity of the photovoltaic station 300 is also more accurate. Therefore, a more accurate available power capacity of the photovoltaic station 300 can be obtained by using the real-time active power of the sample inverters.

Embodiment 2 of a Power Coordination Method for a Photovoltaic Station 300

According to the power coordination method for the photovoltaic station 300 provided in this application, the photovoltaic station 300 obtains available active capacities and available reactive capacities of arrays by using sample inverters, and allocates available active capacities and available reactive capacities to the corresponding arrays based on target active power and target reactive power of the station and priorities of the arrays, to differentially coordinate available power capacities of the arrays.

A manner in which the photovoltaic station 300 differentially coordinates power of the arrays is not limited in this embodiment of this application. The following provides detailed descriptions by using an example in which the photovoltaic station 300 adjusts the power of the arrays according to a priority sequence.

Figure 6:
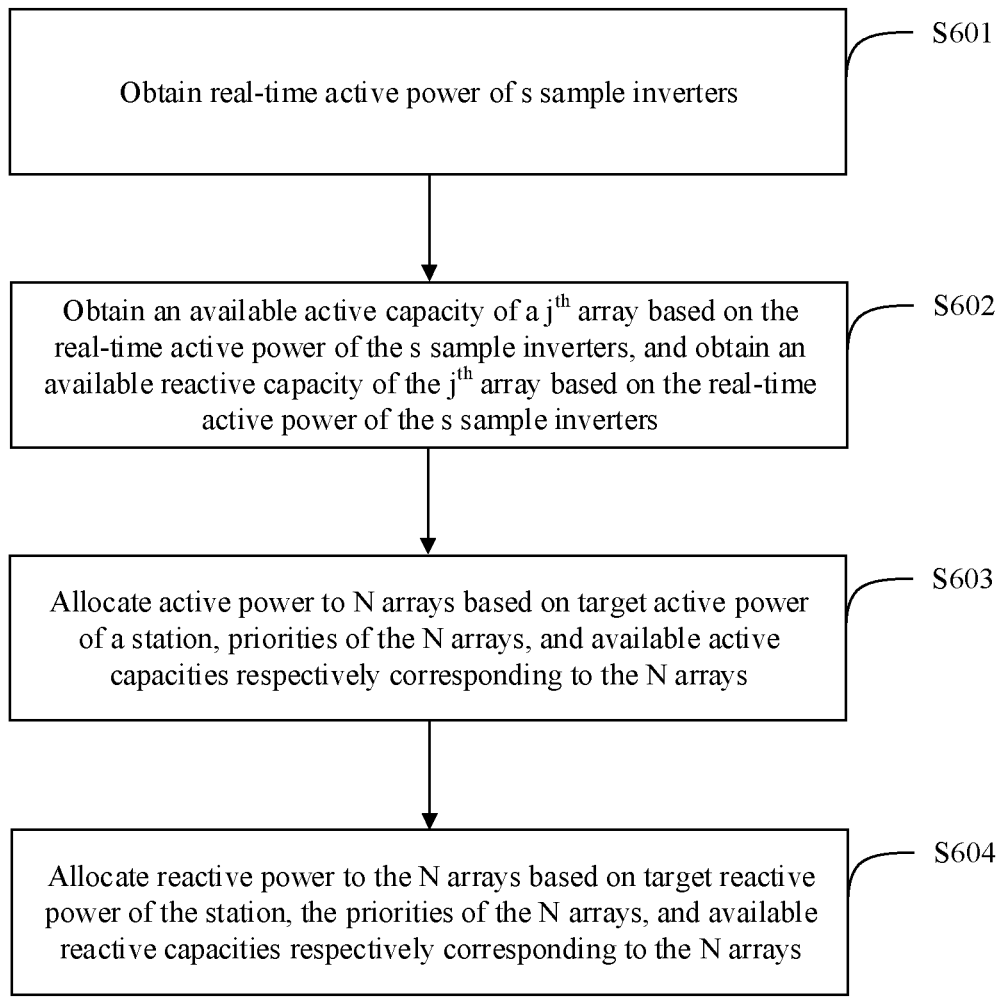
FIG. 6 is a flowchart of another power coordination method for a photovoltaic station according to an embodiment of this application.

FIG. 6 is a flowchart of another power coordination method for a photovoltaic station according to an embodiment of this application.

S601: Obtain real-time active power of s sample inverters.

S602: Obtain an available active capacity of a $j^{th}$ array based on the real-time active power of the s sample inverters, and obtain an available reactive capacity of the $j^{th}$ array based on the real-time active power of the s sample inverters.

For S601 and S602 in this embodiment of this application, refer to S501 and S502. Details are not described herein again.

S603: Allocate active power to N arrays based on target active power of the station, priorities of the N arrays, and available active capacities respectively corresponding to the N arrays.

A manner in which the photovoltaic station obtains the target active power of the station is not limited in this embodiment of this application. For example, the photovoltaic station may directly receive an instruction that is of the target active power of the station and that is sent by an upper stage, for example, a scheduling center. For another example, the target active power of the station is preset inside the photovoltaic station.

Further, due to a control error in the inverter device, a loss caused by a distance from the photovoltaic station to the array or a distance from the photovoltaic station to the inverter, a loss of another device in the photovoltaic station, and the like, after receiving the instruction from the upper stage, the photovoltaic station adds a preset increment to the target active power as estimated target active power of the station, so that the estimated target active power of the station includes an estimated loss. Therefore, adjustment of the array or adjustment of the inverter can be more accurate.

A value of the preset increment is not limited in this embodiment of this application. The preset increment may be set based on various losses. For example, the preset increment may be a plant loss value that is set based on experience.

Further, the photovoltaic station may continuously adjust the target active power of the station to adapt to a continuously-changing working condition of the photovoltaic station.

The photovoltaic station obtains a deviation, where the deviation is a deviation between real-time active power measured by a grid-tied point and the target active power received by the station, and/or a deviation between real-time reactive power measured by the grid-tied point and target reactive power received by the station; determines whether the deviation falls within a dead zone range; and if yes, ends this round of adjustment, and waits to perform S602 when a deviation exceeds the dead zone range next time; or if no, multiplies the deviation by a multiple to obtain a value and reversely adds the value to the preset increment, and newly adjusts the estimated target active power of the station, so that the target active power of the station can be reached when the estimated target active power of the station is delivered to the arrays or inverters.

After newly adjusting the estimated target active power of the station, the photovoltaic station determines whether the deviation exceeds the dead zone range; and if yes, ends this round of adjustment; or if no, waits to perform S601 when receiving an instruction from the upper stage next time or learning that a deviation of an active power value or a reactive power value of the grid-tied point obviously increases (usually indicating that meteorological illumination obviously changes).

A quantity of times of adjusting the preset increment is not limited in this embodiment of this application. For example, the quantity of times of adjusting the preset increment does not exceed 3, so that arrays or inverters that need to be adjusted reach the target reactive power or the target active power of the station within limited time.

A manner of setting the priorities of the arrays is not limited in this embodiment of this application. For example, the priorities of the arrays may be preset and stored in the scheduling center or the photovoltaic station. For another example, the priorities of the arrays may be set in real time and stored in the photovoltaic station.

In this embodiment of this application, the priorities of the arrays are set, so that an array having a special requirement can be preferentially met. For example, the priorities of the arrays may be set to 1, 2, 3, 4, 5, and the like. A larger number indicates a higher priority. Based on the priorities, full-amount arrangement is preferentially made for an array with a relatively high priority to participate in allocation of available active power.

The priorities of the arrays in the photovoltaic station are not limited in this embodiment of this application. For example, all the arrays in the photovoltaic station have a same priority. For another example, two levels, namely, a priority level and a common level, may be set to determine whether an array in the photovoltaic station has a special requirement.

After obtaining the target active power of the station, the priorities of the N arrays, and the available active capacities respectively corresponding to the N arrays, the photovoltaic station allocates the active power to the N arrays.

S604: Allocate reactive power to the N arrays based on the target reactive power of the station, the priorities of the N arrays, and available reactive capacities respectively corresponding to the N arrays.

For a method in which the photovoltaic station allocates the reactive power to the N arrays, refer to the method in which the photovoltaic station allocates the active power to the N arrays in S603. Same parts are not described again.

In order that a person skilled in the art better understands the technical solutions provided in this embodiment, the following provides detailed descriptions by using two arrays as an example.

For an array A, a priority is 2, an available active capacity is 2.9 megawatts (MW), an available reactive capacity is 0.77 megavars (MVar), and maximum apparent power is 3 megavolt amperes (MVA). For an array B, a priority is 1, an available active capacity is 2.5 MW, an available reactive capacity is 1.66 MVar, and maximum apparent power is 3 MVA. The priority of the array A is higher than the priority of the array B. The target active power that is of the station and that is obtained by the photovoltaic station is 4.9 MW, the target reactive power of the station is 2 MVar, a preset increment of the target active power of the station is dP, and a preset increment of the target reactive power of the station is dQ.

Because the priority of the array A is higher than the priority of the array B, a full-amount available active capacity is preferentially allocated to the array A. An available active capacity of 2.9 MW is allocated to the array A, and an available reactive capacity of 0.77 MVar is allocated to the array A according to a condition that a sum of a square of active power and a square of reactive power is a square of maximum apparent power.

Then, an available active capacity of (4.9+dP−2.9) MW and an available reactive capacity of (2+dQ−0.77) MVar are allocated to the array B.

An execution sequence of step S604 and step S603 is not limited in this embodiment of this application. For example, S604 may be first performed, and then S603 may be performed. Alternatively, S603 and S604 may be simultaneously performed.

The power coordination method for the photovoltaic station provided in this application is applicable to a case in which the arrays in the photovoltaic station have at least two priorities. The photovoltaic station first obtains different available power capacities of all the arrays, that is, first obtains power generation capabilities of all the arrays; and performs differential power allocation based on the power generation capabilities of the arrays and the priorities of the arrays, so that power can be preferentially allocated to an array with a relatively high priority while the power generation capabilities of the arrays are fully exerted. Compared with even power allocation, the method can improve an electric energy yield.

Embodiment 3 of a Power Coordination Method for a Photovoltaic Station

According to the power coordination method for the photovoltaic station provided in this application, available reactive capacities are first adjusted, and then available active capacities are adjusted, so that when the available reactive capacities of arrays are less than target reactive power of the station, available active capacities of some arrays can be scarified to enable the available reactive capacities to reach the target reactive power of the station, thereby reducing energy consumption, improving grid voltage quality, reducing a penalty, and increasing a revenue.

The following describes, with reference to accompanying drawings, the power coordination method for the photovoltaic station provided in this embodiment of this application.

N arrays requiring power coordination have at least arrays of two different priorities: arrays of a first priority and arrays of a second priority, where the first priority is higher than the second priority.

After available reactive capacities of the arrays are obtained based on real-time active power of sample inverters, two cases are obtained through classification based on whether a total available reactive capacity of the N arrays is greater than or equal to target reactive power of the station. In a first case, the total available reactive capacity of the N arrays is greater than or equal to the target reactive power of the station. In a second case, the total available reactive capacity of the N arrays is less than the target reactive power of the station.

Figure 7:
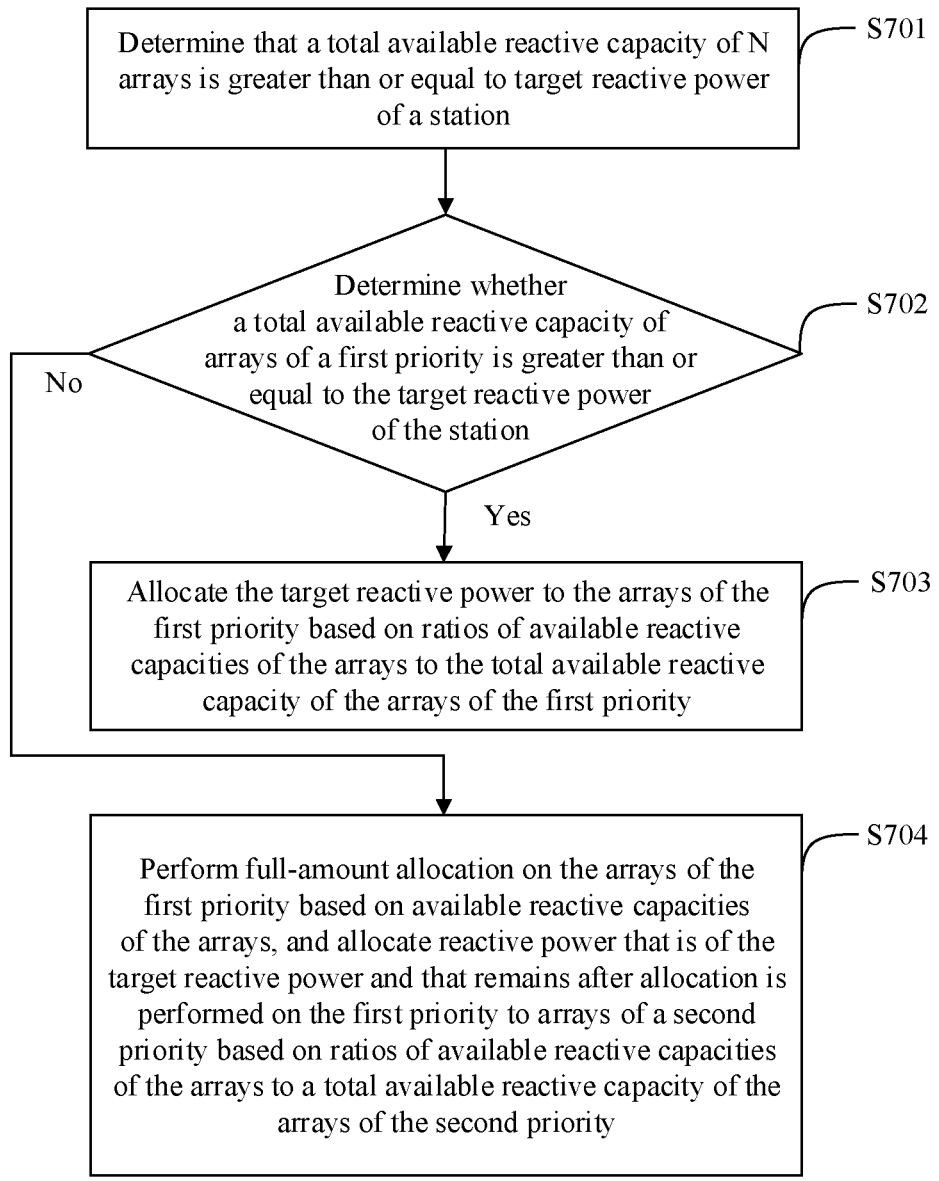
FIG. 7 is a flowchart of still another power coordination method for a photovoltaic station according to an embodiment of this application.
Figure 9:
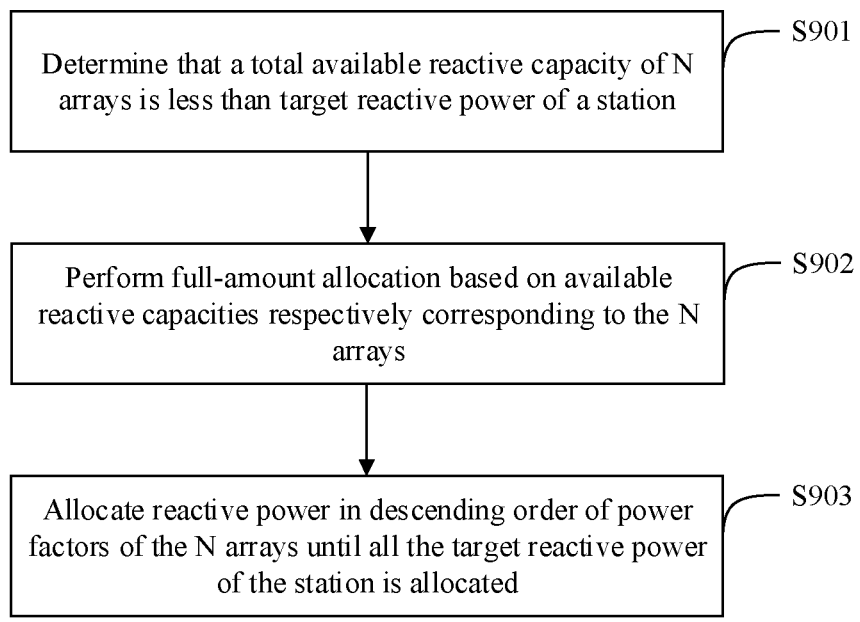
FIG. 9 is a flowchart of another power coordination method for a photovoltaic station according to an embodiment of this application.

The following separately describes the first case in detail with reference to FIG. 7 and describes the second case in detail with reference to FIG. 9.

FIG. 7 is a flowchart of still another power coordination method for a photovoltaic station according to an embodiment of this application.

S701: Determine that a total available reactive capacity of N arrays is greater than or equal to target reactive power of the station.

When the total available reactive capacity of the N arrays is greater than or equal to the target reactive power of the station, available reactive capacities may be allocated based on priorities of the arrays.

S702: Determine whether a total available reactive capacity of arrays of a first priority is greater than or equal to the target reactive power of the station; and if yes, perform S703; or if no, perform S704. In order that a person skilled in the art better understands the technical solutions provided in this embodiment, the following provides detailed descriptions by using three arrays as an example.

For example, for an array A, a priority is 3, and an available reactive capacity is 3 MW; for an array B, a priority is 2, and an available reactive capacity is 4 MW; and for an array C, a priority is 1, an available reactive capacity is 2 MW. The priority of the array A is higher than the priority of the array B, and the priority of the array B is higher than the priority of the array C.

In the first case, when the target reactive power of the station is 2 MW, reactive power is first allocated to the array A. Because 3 MW is greater than 2 MW, the array A can complete allocation of the target reactive power of the station, and reactive power does not need to be allocated to the array B or the array C.

In the second case, when the target reactive power of the station is 9 MW, reactive power is first allocated to the array A. Because 3 MW is less than 9 MW, reactive power continues to be allocated to the array B. Because 7 MW is less than 9 MW, reactive power continues to be allocated to the array C. Because 9 MW is equal to 9 MW, all the target reactive power of the station is allocated.

In a third case, when the target reactive power of the station is 10 MW, reactive power is first allocated to the array A. Because 3 MW is less than 10 MW, reactive power continues to be allocated to the array B. Because 7 MW is less than 10 MW, reactive power continues to be allocated to the array C. Because 9 MW is less than 10 MW, although the available reactive capacities of all the arrays in the station are allocated, the target reactive power of the station cannot be met. In this case, a part of active power needs to be sacrificed to meet the target reactive power of the station. For details, refer to FIG. 9. The details are not described herein again.

S703: Allocate the target reactive power of the station to the arrays of the first priority based on ratios of available reactive capacities of the arrays to the total available reactive capacity of the arrays of the first priority.

When a plurality of arrays have a same priority, for example, in the foregoing example, arrays whose priorities are 3 include not only the array A but also an array D, available reactive capacities may be allocated to the arrays of the first priority based on the ratios.

The arrays of the first priority have one or more arrays. The following provides descriptions by using a $j^{th}$ array as an example.

The available reactive capacities are allocated to the arrays of the first priority based on the ratios, as shown in the following formula:

$$Q_{send-A-1} = \frac{Q_{A-j-max}}{Q_{norm-max-all}} \times Q_{norm-target}, \quad (5)$$

where $Q_{send-A-j}$ is a target value of an available reactive capacity allocated to the $j^{th}$ array, $Q_{A-j-max}$ is an available reactive capacity of the $j^{th}$ array, $Q_{N-norm-max-all}$ is the total available reactive capacity of the arrays of the first priority, and $Q_{norm-target}$ is the target reactive power of the photovoltaic station.

In order that a person skilled in the art better understands the technical solutions provided in this embodiment, the following provides detailed descriptions by using two arrays as an example.

An available reactive capacity of an array A is 2.9 MW, and an available reactive capacity of an array B is 2.5 MW. All the arrays in the photovoltaic station have a priority 1.

An available reactive capacity of the array A is 2.9/(2.9+2.5)×(4.9+dP−0), and an available reactive capacity of the array B is 2.5/(2.9+2.5)×(4.9+dP−0).

S704: Perform full-amount allocation on the arrays of the first priority based on available reactive capacities of the arrays, and allocate reactive power that is of the target reactive power and that remains after allocation is performed on the first priority to arrays of a second priority based on ratios of available reactive capacities of the arrays to a total available reactive capacity of the arrays of the second priority.

When the total available reactive capacity of the arrays of the first priority is less than the target reactive power of the station, a full-amount available reactive capacity may be first allocated to each of the arrays of the first priority based on an available reactive capacity corresponding to the array. In this case, the target reactive power of the station is not met, and unmet reactive power is reactive power obtained by subtracting reactive power allocated to the first priority from the target reactive power of the station, namely, the reactive power that is of the target reactive power and that remains after allocation is performed on the first priority.

The remaining reactive power is allocated to the arrays of the second priority based on the ratios of the available reactive capacities of the arrays to the total available reactive capacity of the arrays of the second priority. The arrays of the second priority have one or more arrays. The following provides descriptions by using a $j^{th}$ array as an example.

Available reactive capacities are allocated to the arrays of the second priority based on the ratios, as shown in the following formula:

$$Q_{send-A-j} = \frac{Q_{A-j-max}}{Q_{norm-max-all}} \times Q_{norm-target}, \quad (6)$$

where $Q_{send-A-j}$ is a target value of an available reactive capacity allocated to the $j^{th}$ array, $Q_{A-j-max}$ is an available reactive capacity of the $j^{th}$ array, $Q_{norm-max-all}$ is the total available reactive capacity of the arrays of the second priority, and $Q_{norm-target}$ is the remaining reactive power of the photovoltaic station.

After available reactive capacities of the arrays are allocated, that is, after S703 or S704, available active capacities of the arrays continue to be adjusted.

Figure 8:
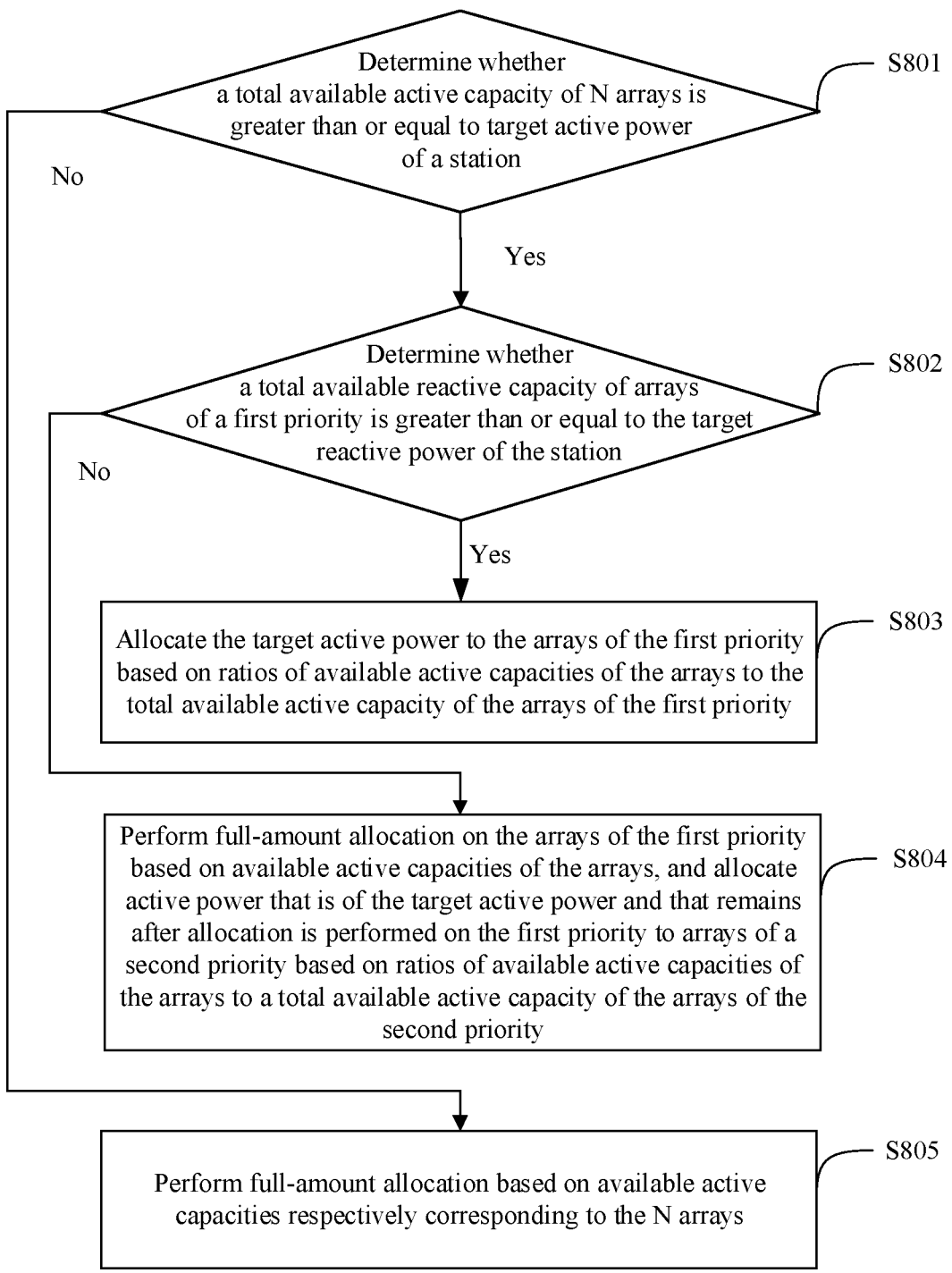
FIG. 8 is a flowchart of yet another power coordination method for a photovoltaic station according to an embodiment of this application.

FIG. 8 is a flowchart of yet another power coordination method for a photovoltaic station according to an embodiment of this application.

S801: Determine whether a total available active capacity of N arrays is greater than or equal to target active power of the station; and if yes, perform S802; or if no, perform S805.

S802: Determine whether a total available active capacity of N arrays is greater than or equal to the target active power of the station; and if yes, perform S803; or if no, perform S804.

S803: Allocate the target active power to the arrays of the first priority based on ratios of available active capacities of the arrays to the total available active capacity of the arrays of the first priority.

When a plurality of arrays have a same priority, available active capacities may be allocated to the arrays of the first priority based on the ratios.

The arrays of the first priority have one or more arrays. The following provides descriptions by using a $j^{th}$ array as an example.

The available active capacities are allocated to the arrays of the first priority based on the ratios, as shown in the following formula:

$$P_{send-A-j} = \frac{P_{A-j-max}}{P_{norm-max-all}} \times P_{norm-target}, \quad (7)$$

where $P_{send-A-j}$ is a target value of an available active capacity allocated to the $j^{th}$ array, $P_{A-j-max}$ is an available active capacity of the $j^{th}$ array, $P_{norm-max-all}$ is the total available active capacity of the arrays of the first priority, and $P_{norm-target}$ is the target active power of the photovoltaic station.

S804: Perform full-amount allocation on the arrays of the first priority based on available active capacities of the arrays, and allocate active power that is of the target active power and that remains after allocation is performed on the first priority to arrays of a second priority based on ratios of available active capacities of the arrays to a total available active capacity of the arrays of the second priority.

When the total available active capacity of the arrays of the first priority is less than the target active power of the station, a full-amount available active capacity may be first allocated to each of the arrays of the first priority based on an available active capacity corresponding to the array. In this case, the target active power of the station is not met, and unmet active power is active power obtained by subtracting active power allocated to the first priority from the target active power of the station, namely, the active power that is of the target active power and that remains after allocation is performed on the first priority.

The remaining active power is allocated to the arrays of the second priority based on the ratios of the available active capacities of the arrays to the total available active capacity of the arrays of the second priority.

The arrays of the second priority have one or more arrays. The following provides descriptions by using a $j^{th}$ array as an example.

Available active capacities are allocated to the arrays of the second priority based on the ratios, as shown in the following formula:

$$P_{send-A-j} = \frac{P_{A-j-max}}{P_{norm-max-all}} \times P_{norm-target}, \qquad (8)$$

where $P_{send-A-j}$ is a target value of an available active capacity allocated to the $j^{th}$ array, $P_{A-j-max}$ is an available active capacity of the $j^{th}$ array, $P_{norm-max-all}$ is the total available active capacity of the arrays of the second priority, and $P_{norm-target}$ is the remaining active power of the photovoltaic station.

S805: Perform full-amount allocation based on available active capacities respectively corresponding to the N arrays.

When the total available active capacity of the N arrays cannot reach the target active power of the station, full-amount allocation is performed based on the available active capacities respectively corresponding to the N arrays.

The foregoing describes a case in which the total available reactive capacity of the N arrays is greater than or equal to the target reactive power of the station after the available reactive capacities of the arrays are obtained based on the real-time active power of the sample inverters, namely, the first case. The following describes, in detail with reference to FIG. 9, the second case, namely, a case in which the total available reactive capacity of the N arrays is less than the target reactive power of the station.

FIG. 9 is a flowchart of another power coordination method for a photovoltaic station according to an embodiment of this application.

S901: Determine that a total available reactive capacity of N arrays is less than target reactive power of the station.

S902: Perform full-amount allocation based on available reactive capacities respectively corresponding to the N arrays.

S903: Allocate reactive power in descending order of power factors of the N arrays until all the target reactive power of the station is allocated. When the total available reactive capacity of the N arrays is less than the target reactive power, full-amount allocation is first performed on each array based on an available reactive capacity corresponding to each array; and then sorting is performed based on the power factors of all the arrays, and reactive power allocation is started from an array with a relatively large power factor to adjust power step by step, until all the target reactive power is allocated.

The power factors are obtained by using current allocated available reactive capacities of the arrays and maximum apparent power corresponding to the arrays. The power factors vary with the allocated available reactive capacities of the arrays. In order that a person skilled in the art better understands the technical solutions provided in this embodiment, the following provides detailed descriptions by using two arrays as an example.

For example, for an array A, a power factor is 1, and an available active capacity is 3 MW; for an array B, a power factor is 0.8, and an available active capacity is 4 MW; and the target active power of the station is 9 MW.

A total available active capacity of the array A and the array B is 7 MW, and 7 MW is less than 9 MW, that is, the total available active capacity of the arrays is less than the target active power. First, 3 MW is allocated to the array A, and 4 MW is allocated to the array B. The power factor of the array A is greater than the power factor of the array B. Therefore, power is first allocated to the array A. If a capability of the array A can be further extended by 2 MW, power does not need to be allocated to the array B. If a capacity of array A can be expanded by only 1 MW, power needs to be further allocated to the array B, until all the target active power of 9 MW of the station is allocated.

Compared with available reactive capacities obtained based on available active capacities, there is a change for available reactive capacities obtained after adjustment is performed based on the power factors. However, because maximum apparent power remains unchanged, the available active capacities also change with the available reactive capacities. To achieve a more stable grid voltage, active power is scarified to preferentially meet reactive power allocation. Therefore, the available active capacities need to be newly adjusted based on the maximum apparent power and allocated available reactive capacities.

After available reactive capacities of the arrays are allocated, that is, after S903, available active capacities of the arrays continue to be adjusted. Updated available active capacities are obtained based on the maximum apparent power and the allocated available reactive capacities. Two cases are obtained through classification based on whether an updated total available active capacity of the N arrays is greater than or equal to target active power of the station. In the first case, the updated total available active capacity of the N arrays is greater than or equal to the target active power of the station. In the second case, the updated total available active capacity of the N arrays is less than the target active power of the station.

Figure 10:
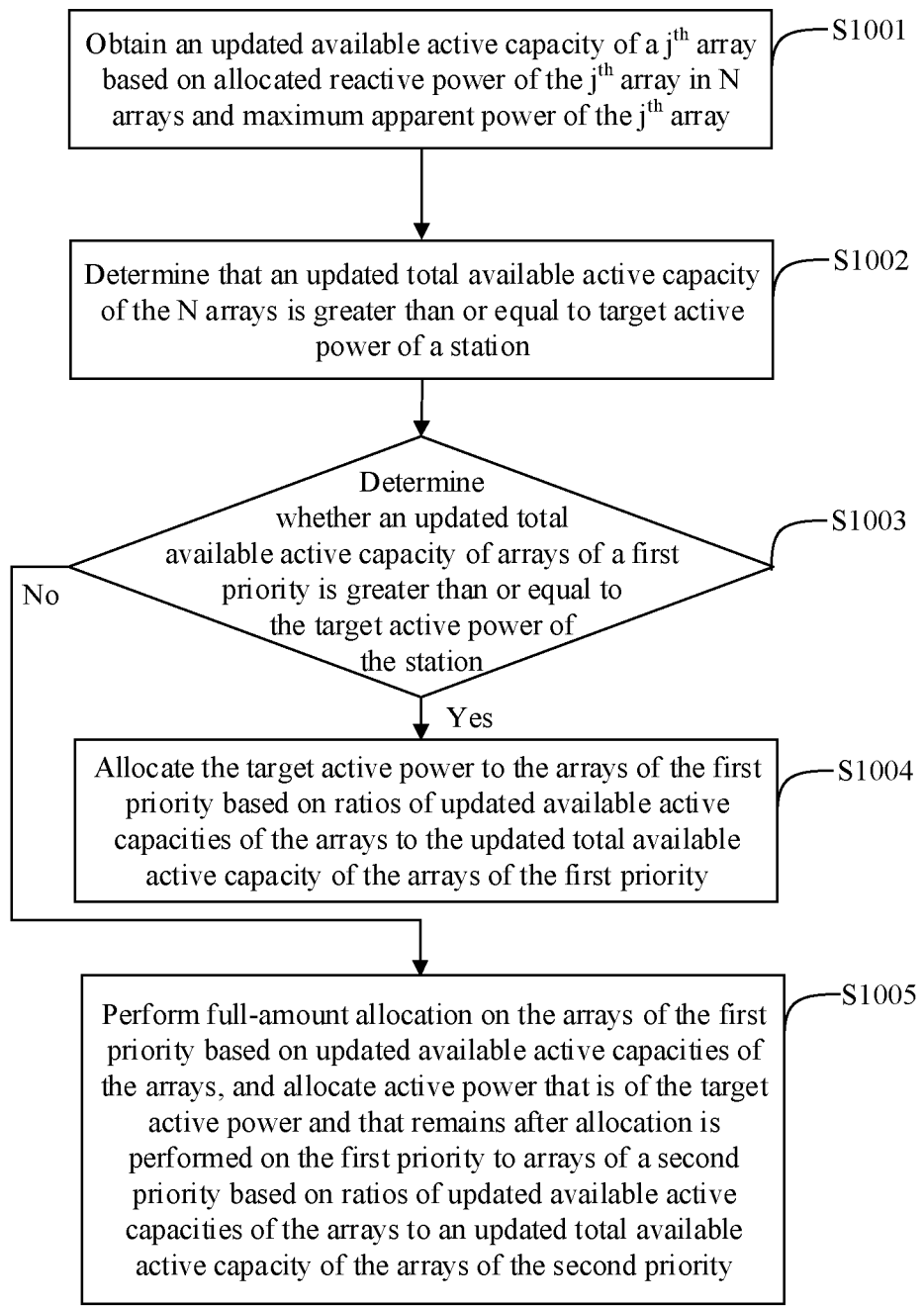
FIG. 10 is a flowchart of still another power coordination method for a photovoltaic station according to an embodiment of this application.
Figure 11:
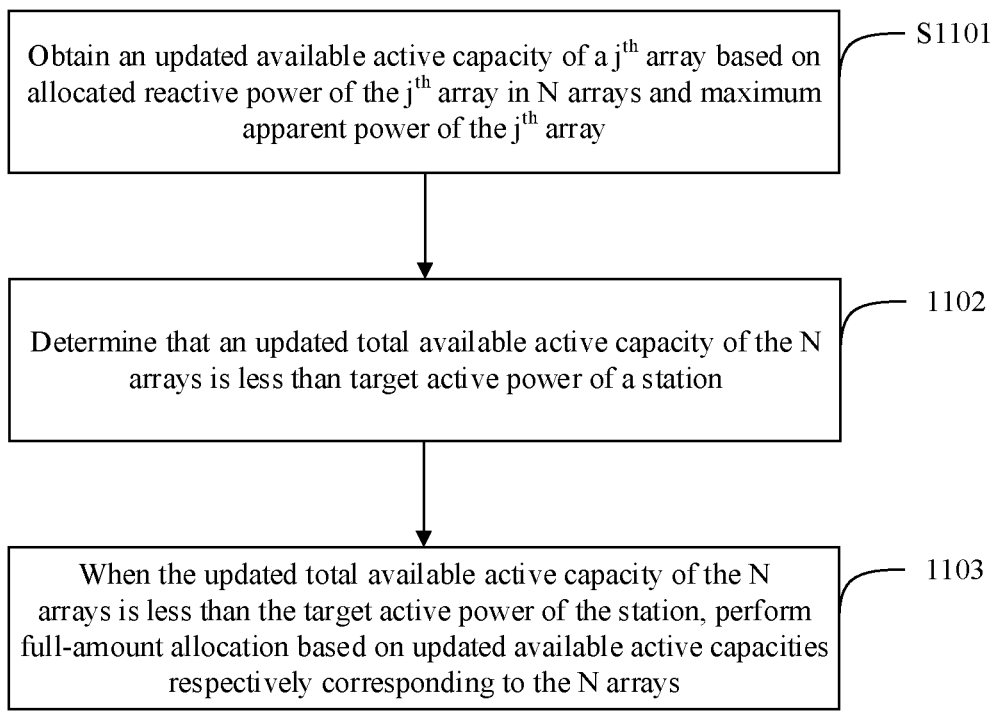
FIG. 11 is a flowchart of yet another power coordination method for a photovoltaic station according to an embodiment of this application.

The following describes the first case with reference to FIG. 10 and describes the second case with reference to FIG. 11.

FIG. 10 is a flowchart of still another power coordination method for a photovoltaic station according to an embodiment of this application.

S1001: Obtain an updated available active capacity of a $j^{th}$ array based on allocated reactive power of the $j^{th}$ array in N arrays and maximum apparent power of the $j^{th}$ array.

S1002: Determine that an updated total available active capacity of the N arrays is greater than or equal to target active power of the station.

S1003: Determine whether an updated total available active capacity of arrays of a first priority is greater than or equal to the target active power of the station; and if yes, perform S1004; or if no, perform S1005.

S1004: Allocate the target active power to the arrays of the first priority based on ratios of updated available active capacities of the arrays to the updated total available active capacity of the arrays of the first priority.

S1005: Perform full-amount allocation on the arrays of the first priority based on updated available active capacities of the arrays, and allocate active power that is of the target active power and that remains after allocation is performed on the first priority to arrays of a second priority based on ratios of updated available active capacities of the arrays to an updated total available active capacity of the arrays of the second priority.

For related parts of S1001 to S1005, refer to the descriptions corresponding to FIG. 8. Details are not described herein again.

The foregoing describes a case in which the updated total available active capacity of the N arrays is greater than or equal to the target active power of the station, namely, the first case. The following describes, in detail with reference to FIG. 11, the second case, namely, a case in which the updated total available active capacity of the N arrays is less than the target active power of the station.

FIG. 11 is a flowchart of yet another power coordination method for a photovoltaic station according to an embodiment of this application.

S1101: Obtain an updated available active capacity of a $j^{th}$ array based on allocated reactive power of the $j^{th}$ array in N arrays and maximum apparent power of the $j^{th}$ array.

S1102: Determine that an updated total available active capacity of the N arrays is less than target active power of the station.

S1103: When the updated total available active capacity of the N arrays is less than the target active power of the station, perform full-amount allocation based on updated available active capacities respectively corresponding to the N arrays.

For related parts, refer to the descriptions corresponding to FIG. 8. Details are not described herein again.

According to the foregoing method, the photovoltaic station first adjusts the available reactive capacities, and then adjusts the available active capacities, so that when the available reactive capacities of the arrays are lower than the target reactive power of the station, available active capacities of some arrays can be scarified to enable reactive power to reach the target reactive power of the station, thereby reducing energy consumption, improving grid voltage quality, reducing a penalty, and increasing a revenue. In addition, a target power value of the station is reached at the first time the photovoltaic station allocates power. However, in an even power allocation method, a target power value of the station can be reached only by performing a plurality of rounds of fine adjustment. Compared with the even power allocation method, the method greatly reduces power coordination response time of the photovoltaic station, reduces or eliminates related assessment and a resulting power loss, and increases a revenue.

Embodiment 4 of a Power Coordination Method for a Photovoltaic Station

Figure 12A:
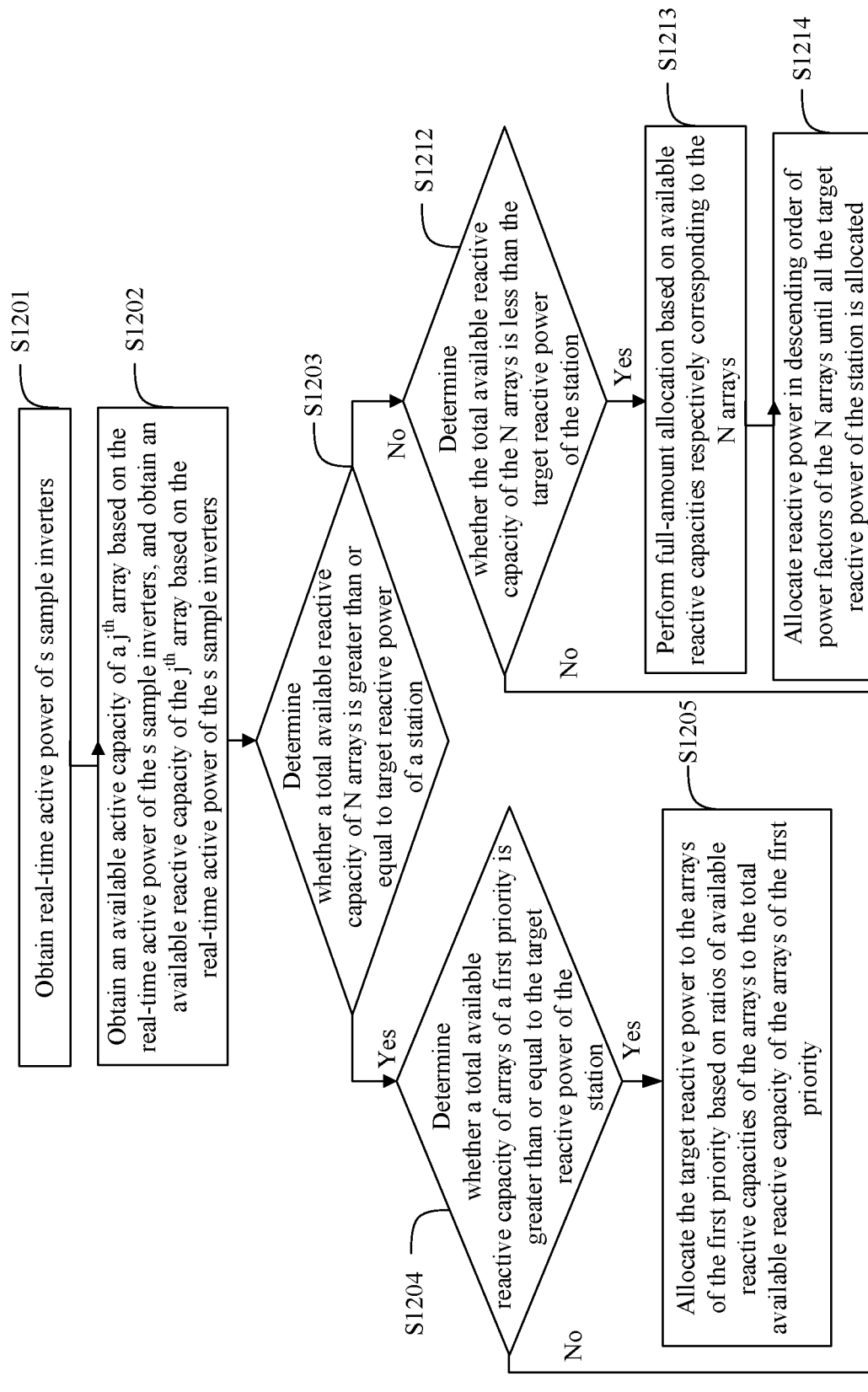
FIG. 12A, FIG. 12B, and FIG. 12C are a flowchart of another power coordination method for a photovoltaic station according to an embodiment of this application.
Figure 12B:
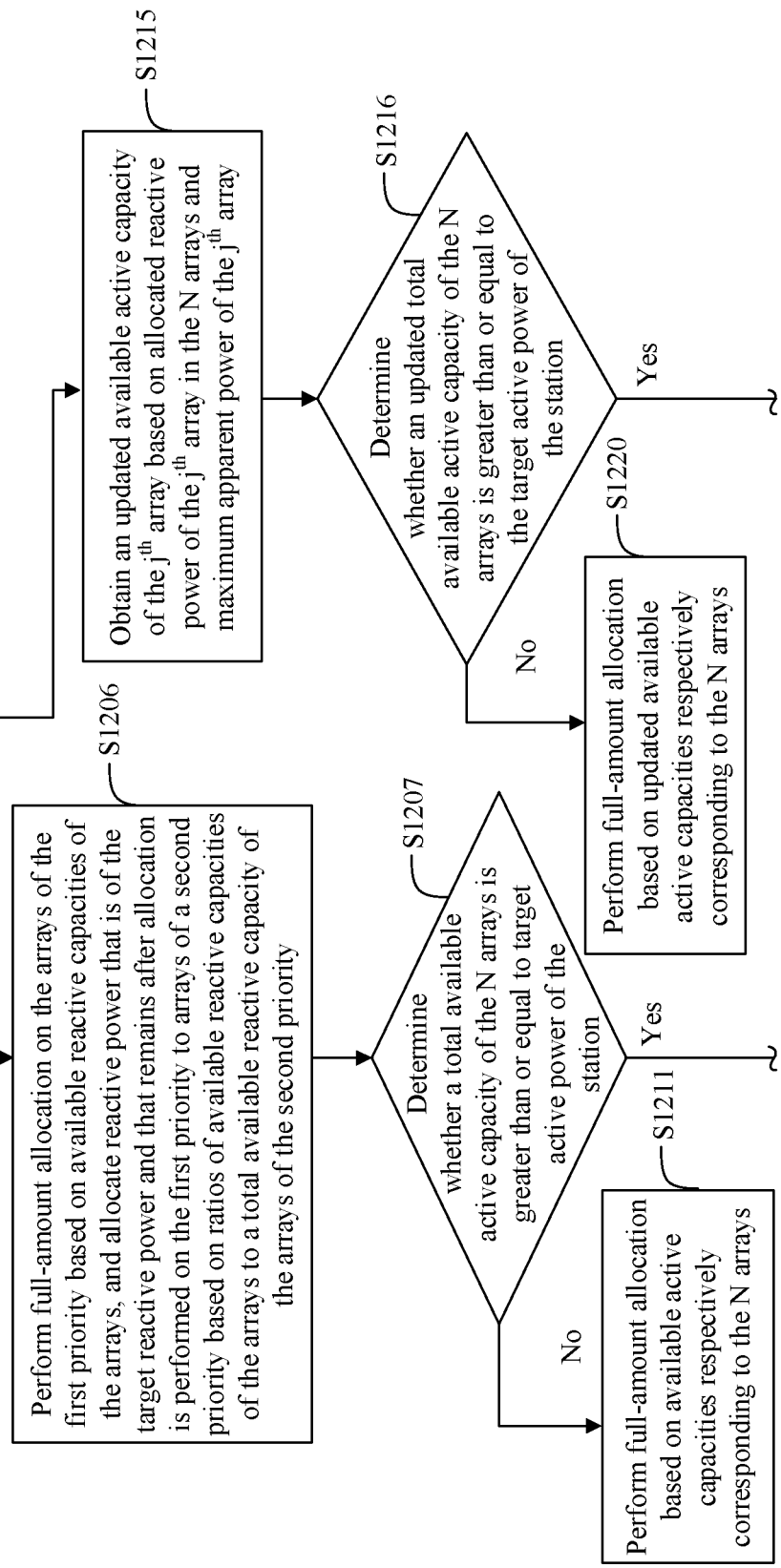
Figure 12C:
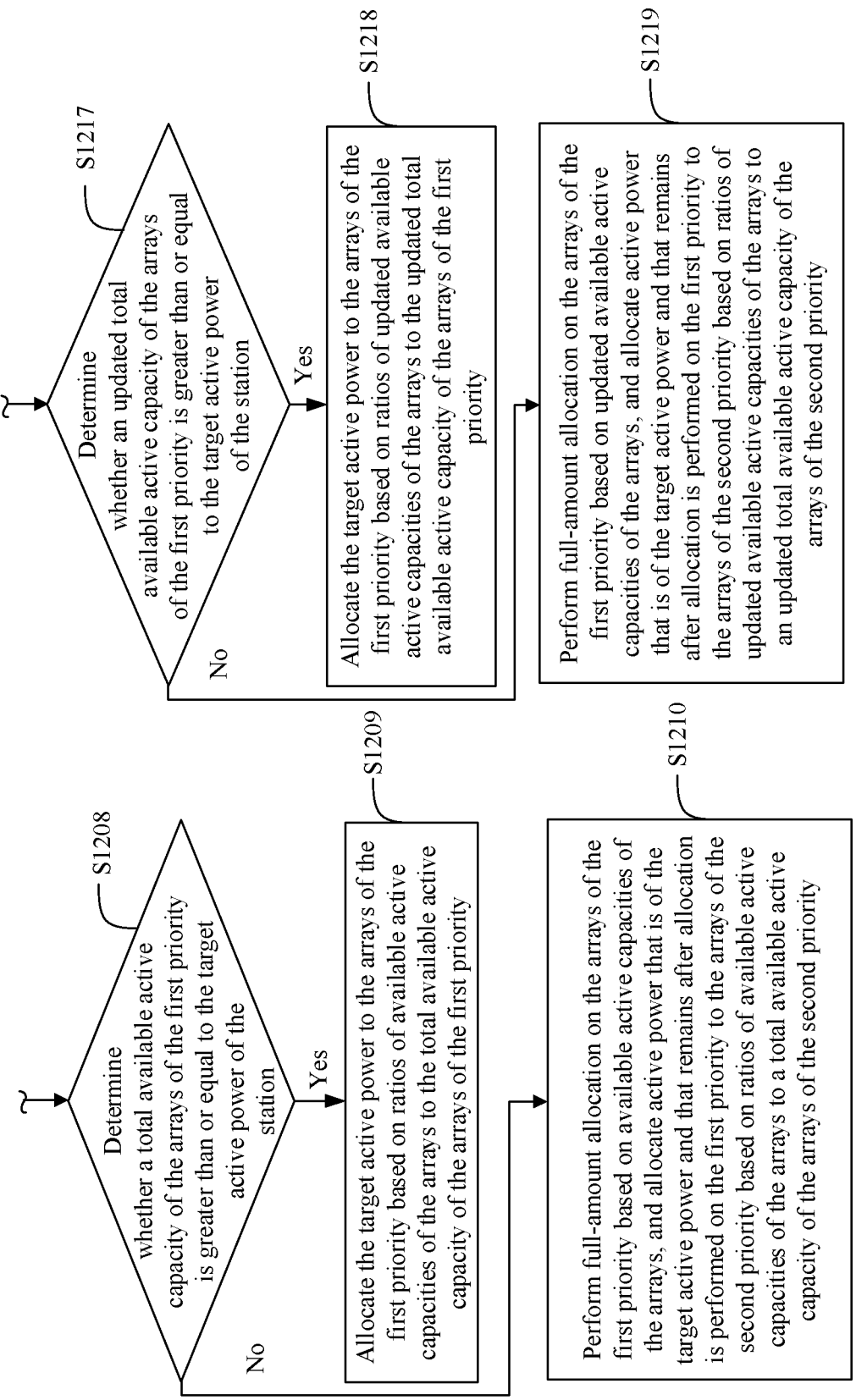

To make the technical solutions provided in this embodiment of this application clearer, the following describes, with reference to FIG. 12A, FIG. 12B, and FIG. 12C by using an embodiment, the power coordination method for the photovoltaic station provided in this embodiment of this application.

The following provides descriptions by using an example in which available reactive capacities are first adjusted and then available active capacities are adjusted.

FIG. 12A, FIG. 12B, and FIG. 12C are a flowchart of another power coordination method for a photovoltaic station according to an embodiment of this application.

S1201: Obtain real-time active power of s sample inverters.

S1202: Obtain an available active capacity of a $j^{th}$ array based on the real-time active power of the s sample inverters, and obtain an available reactive capacity of the $j^{th}$ array based on the real-time active power of the s sample inverters.

S1203: Determine whether a total available reactive capacity of N arrays is greater than or equal to target reactive power of the station; and if yes, perform S1204; or if no, perform S1212.

S1204: Determine whether a total available reactive capacity of arrays of a first priority is greater than or equal to the target reactive power of the station; and if yes, perform S1205; or if no, perform S1206.

S1205: Allocate the target reactive power to the arrays of the first priority based on ratios of available reactive capacities of the arrays to the total available reactive capacity of the arrays of the first priority.

S1206: Perform full-amount allocation on the arrays of the first priority based on available reactive capacities of the arrays, and allocate reactive power that is of the target reactive power and that remains after allocation is performed on the first priority to arrays of a second priority based on ratios of available reactive capacities of the arrays to a total available reactive capacity of the arrays of the second priority.

S1207: Determine whether a total available active capacity of the N arrays is greater than or equal to target active power of the station; and if yes, perform S1208; or if no, perform S1211.

S1208: Determine whether a total available active capacity of the arrays of the first priority is greater than or equal to the target active power of the station; and if yes, perform S1209; or if no, perform S1210.

S1209: Allocate the target active power to the arrays of the first priority based on ratios of available active capacities of the arrays to the total available active capacity of the arrays of the first priority.

S1210: Perform full-amount allocation on the arrays of the first priority based on available active capacities of the arrays, and allocate active power that is of the target active power and that remains after allocation is performed on the first priority to the arrays of the second priority based on ratios of available active capacities of the arrays to a total available active capacity of the arrays of the second priority.

S1211: Perform full-amount allocation based on available active capacities respectively corresponding to the N arrays.

S1212: Determine whether the total available reactive capacity of the N arrays is less than the target reactive power of the station; and if yes, perform S1213; or if no, perform S1215.

S1213: Perform full-amount allocation based on available reactive capacities respectively corresponding to the N arrays.

S1214: Allocate reactive power in descending order of power factors of the N arrays until all the target reactive power of the station is allocated.

S1215: Obtain an updated available active capacity of the $j^{th}$ array based on allocated reactive power of the $j^{th}$ array in the N arrays and maximum apparent power of the $j^{th}$ array.

S1216: Determine whether an updated total available active capacity of the N arrays is greater than or equal to the target active power of the station; and if yes, perform S1217; or if no, perform S1220.

S1217: Determine whether an updated total available active capacity of the arrays of the first priority is greater than or equal to the target active power of the station; and if yes, perform S1218; or if no, perform S1219.

S1218: Allocate the target active power to the arrays of the first priority based on ratios of updated available active capacities of the arrays to the updated total available active capacity of the arrays of the first priority.

S1219: Perform full-amount allocation on the arrays of the first priority based on updated available active capacities of the arrays, and allocate active power that is of the target active power and that remains after allocation is performed on the first priority to the arrays of the second priority based on ratios of updated available active capacities of the arrays to an updated total available active capacity of the arrays of the second priority.

S1220: When the updated total available active capacity of the N arrays is less than the target active power of the station, perform full-amount allocation based on updated available active capacities respectively corresponding to the N arrays.

According to the descriptions of the foregoing embodiment, the power coordination method for the photovoltaic station provided in this embodiment of this application can be completely presented. For implementations and achieved effects, refer to the descriptions of the foregoing embodiments. Details are not described herein again.

Embodiment 5 of a Power Coordination Method for a Photovoltaic Station

Figure 13A:
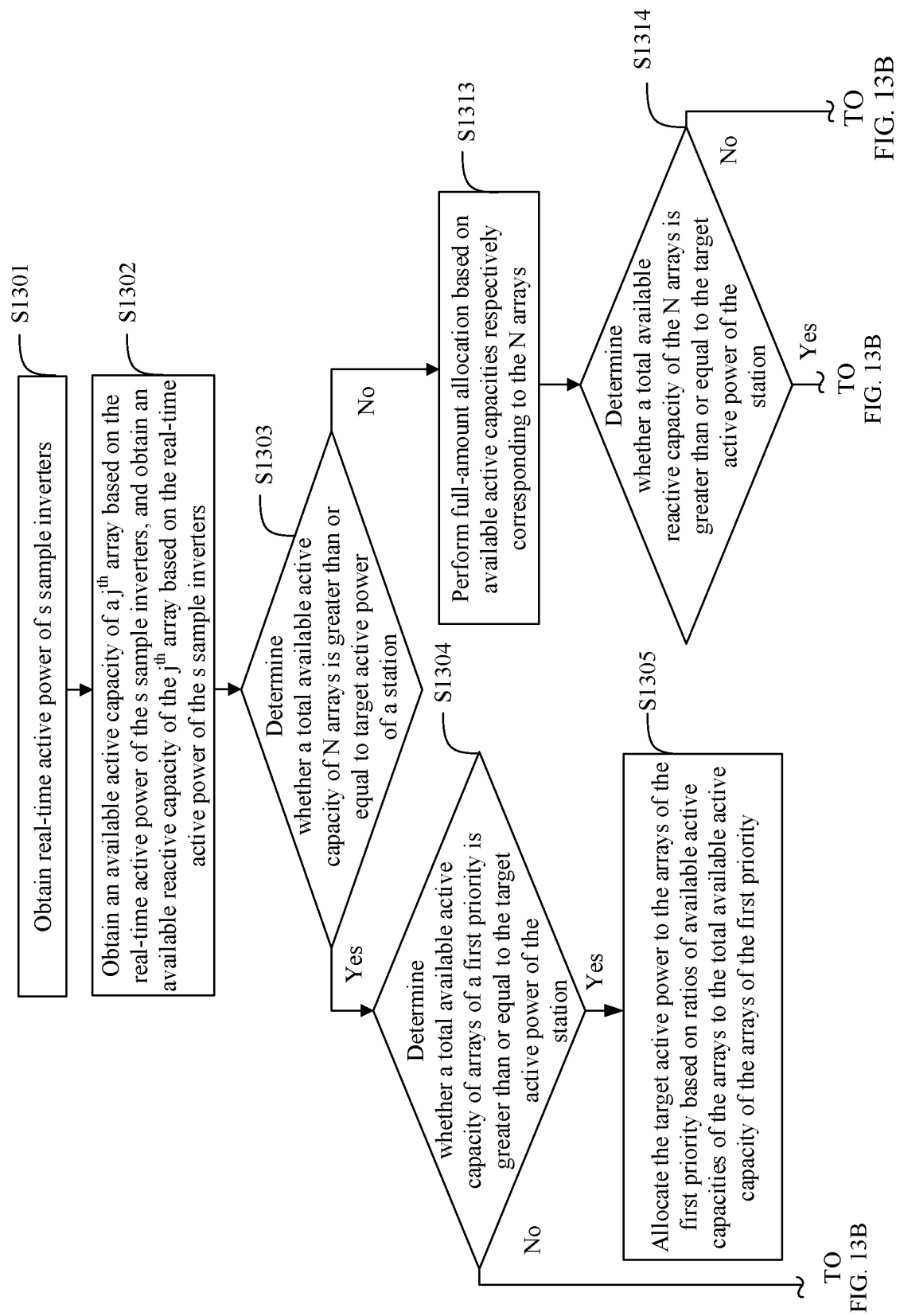
FIG. 13A, FIG. 13B, and FIG. 13C are a flowchart of still another power coordination method for a photovoltaic station according to an embodiment of this application.
Figure 13B:
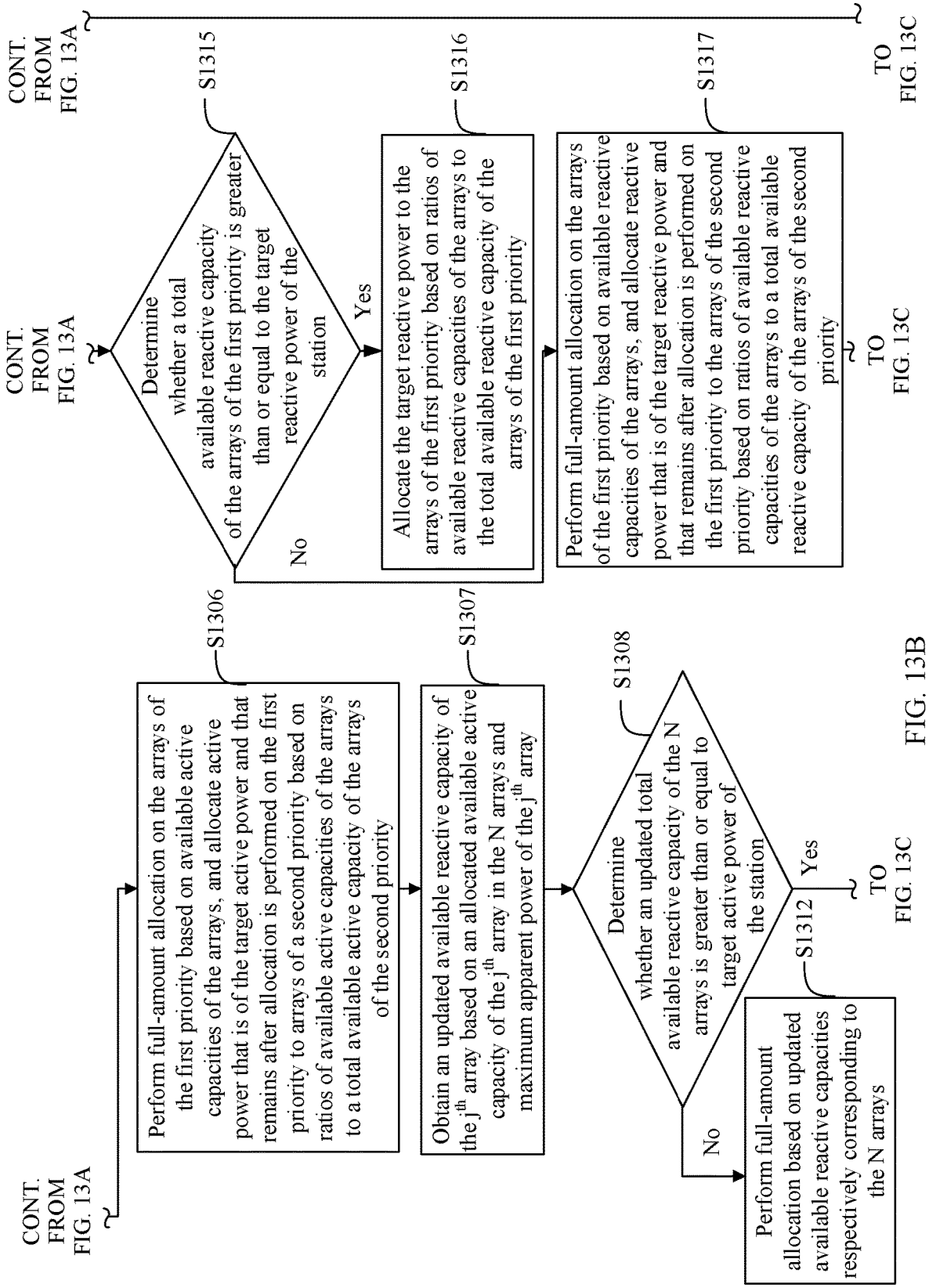
Figure 13C:
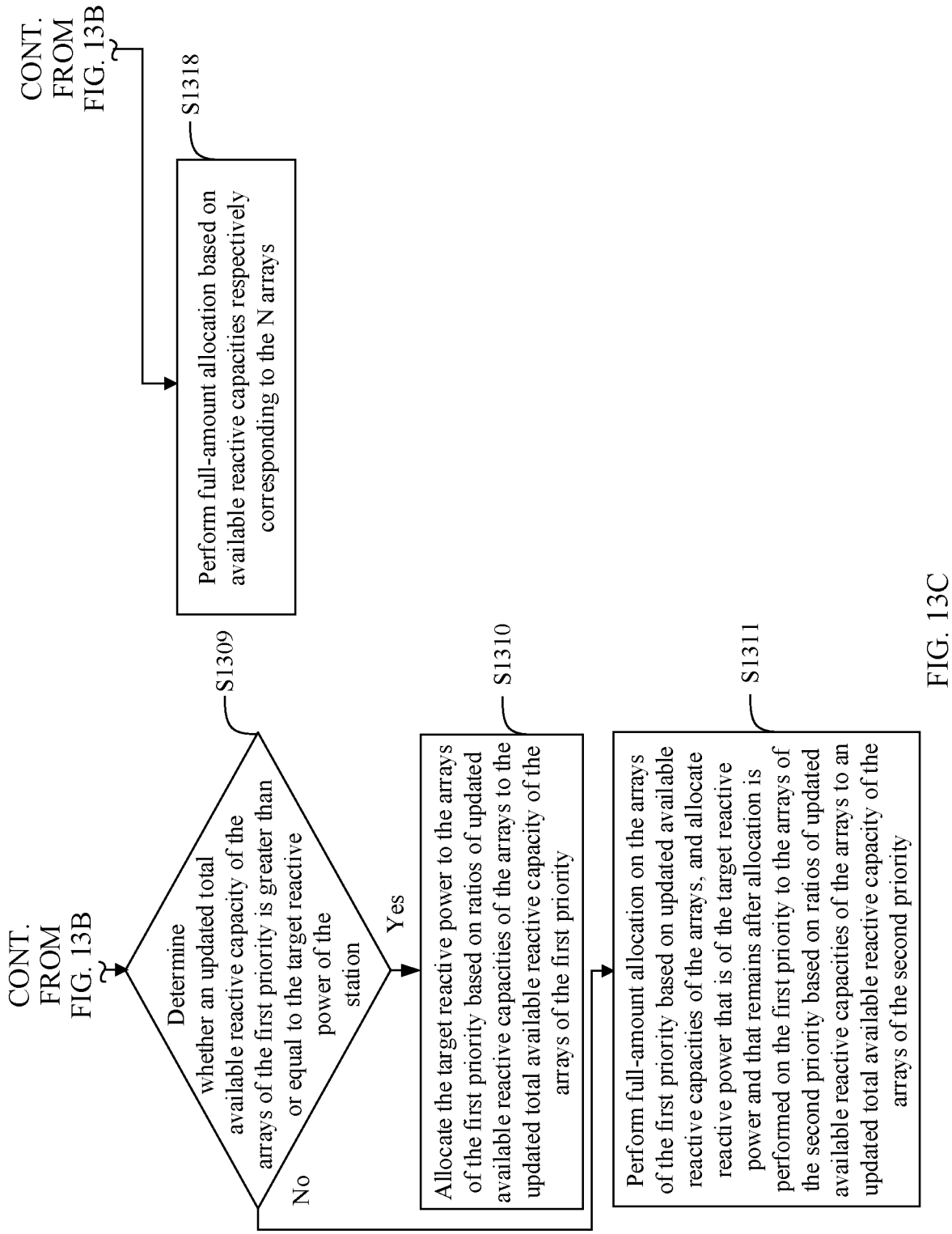

To make the technical solutions provided in this embodiment of this application clearer, the following describes, with reference to FIG. 13A, FIG. 13B, and FIG. 13C by using an embodiment, the power coordination method for the photovoltaic station provided in this embodiment of this application.

The following provides descriptions by using an example in which available active capacities are first adjusted and then available reactive capacities are adjusted.

FIG. 13A, FIG. 13B, and FIG. 13C are a flowchart of still another power coordination method for a photovoltaic station according to an embodiment of this application.

S1301: Obtain real-time active power of s sample inverters.

S1302: Obtain an available active capacity of a $j^{th}$ array based on the real-time active power of the s sample inverters, and obtain an available reactive capacity of the $j^{th}$ array based on the real-time active power of the s sample inverters.

S1303: Determine whether a total available active capacity of N arrays is greater than or equal to target active power of the station; and if yes, perform S1304; or if no, perform S1313.

S1304: Determine whether a total available active capacity of arrays of a first priority is greater than or equal to the target active power of the station; and if yes, perform S1305; or if no, perform S1306.

S1305: Allocate the target active power to the arrays of the first priority based on ratios of available active capacities of the arrays to the total available active capacity of the arrays of the first priority.

S1306: Perform full-amount allocation on the arrays of the first priority based on available active capacities of the arrays, and allocate active power that is of the target active power and that remains after allocation is performed on the first priority to arrays of a second priority based on ratios of available active capacities of the arrays to a total available active capacity of the arrays of the second priority.

S1307: Obtain an updated available reactive capacity of the $j^{th}$ array based on an allocated available active capacity of the $j^{th}$ array in the N arrays and maximum apparent power of the $j^{th}$ array.

S1308: Determine whether an updated total available reactive capacity of the N arrays is greater than or equal to target active power of the station; and if yes, perform S1309; or if no, perform S1312.

S1309: Determine whether an updated total available reactive capacity of the arrays of the first priority is greater than or equal to the target reactive power of the station; and if yes, perform S1310; or if no, perform S1311.

S1310: Allocate the target reactive power to the arrays of the first priority based on ratios of updated available reactive capacities of the arrays to the updated total available reactive capacity of the arrays of the first priority.

S1311: Perform full-amount allocation on the arrays of the first priority based on updated available reactive capacities of the arrays, and allocate reactive power that is of the target reactive power and that remains after allocation is performed on the first priority to the arrays of the second priority based on ratios of updated available reactive capacities of the arrays to an updated total available reactive capacity of the arrays of the second priority.

S1312: When the updated total available reactive capacity of the N arrays is less than the target reactive power of the station, perform full-amount allocation based on updated available reactive capacities respectively corresponding to the N arrays.

S1313: Perform full-amount allocation based on available active capacities respectively corresponding to the N arrays.

S1314: Determine whether a total available reactive capacity of the N arrays is greater than or equal to the target active power of the station; and if yes, perform S1315; or if no, perform S1318.

S1315: Determine whether a total available reactive capacity of the arrays of the first priority is greater than or equal to the target reactive power of the station; and if yes, perform S1316; or if no, perform S1317.

S1316: Allocate the target reactive power to the arrays of the first priority based on ratios of available reactive capacities of the arrays to the total available reactive capacity of the arrays of the first priority.

S1317: Perform full-amount allocation on the arrays of the first priority based on available reactive capacities of the arrays, and allocate reactive power that is of the target reactive power and that remains after allocation is performed on the first priority to the arrays of the second priority based on ratios of available reactive capacities of the arrays to a total available reactive capacity of the arrays of the second priority.

S1318: Perform full-amount allocation based on available reactive capacities respectively corresponding to the N arrays.

For an allocation method of the available active capacities of the arrays, refer to an allocation method of the available reactive capacities of the arrays. The two methods have a same principle, and details are not described herein.

According to the descriptions of the foregoing embodiment, the power coordination method for the photovoltaic station provided in this embodiment of this application can be completely presented. For implementations and achieved effects, refer to the descriptions of the foregoing embodiments. Details are not described herein again.

Embodiment 6 of a Power Coordination Method for a Photovoltaic Station

According to the power coordination methods provided in the embodiments 2 to 5 of this application, the photovoltaic station allocates the available active capacities and the available reactive capacities to the corresponding arrays based on the priorities of the arrays. This embodiment of this application describes a method in which the photovoltaic station allocates available active capacities and available reactive capacities to arrays when the arrays in the photovoltaic station have a same priority, in other words, the arrays in the photovoltaic station have no priorities.

There are two cases in which the photovoltaic station allocates the available active capacities and the available reactive capacities to the arrays. In the first case, the photovoltaic station first allocates the available active capacities to the arrays and then allocates the available reactive capacities to the arrays. In the second case, the photovoltaic station first allocates the available reactive capacities to the arrays and then allocates the available active capacities to the arrays.

The following first describes the first case.

After available active capacities of N arrays requiring power coordination are obtained, it needs to be determined whether a total available active capacity of the N arrays can meet target active power of the station. The following separately describes two cases in which the total available active capacity of the N arrays can meet the target active power of the station and the total available active capacity of the N arrays cannot meet the target active power of the station.

Case 1: The total available active capacity of the N arrays is greater than or equal to the target active power.

The target active power is allocated to the N arrays based on ratios of the available active capacities of the arrays to the total available active capacity of the N arrays.

The following provides descriptions by using a $j^{th}$ array as an example.

The available active capacities of the arrays are allocated based on the ratios, as shown in the following formula:

$$Q_{send-A-j} = \frac{Q_{A-j-max}}{Q_{norm-max-all}} \times Q_{norm-target}, \quad (9)$$

where $Q_{send-A-j}$ is a target value of an available active capacity allocated to the $j^{th}$ array, $Q_{A-j-max}$ is an available active capacity of the $j^{th}$ array, $Q_{N-norm-max-all}$ is the total available active capacity of the N arrays, and $Q_{norm-target}$ is the target active power of the photovoltaic station.

Case 2: The total available active capacity of the N arrays is less than the target active power.

When the total available active capacity of the N arrays cannot meet the target active power of the station, full-amount allocation is performed based on the available active capacities respectively corresponding to the N arrays.

For example, an available active capacity of an array A is 2.9 MW, and an available active capacity of an array B is 2.5 MW. If the target active power of the station is 6 MW, a total available active capacity of the array A and the array B cannot meet the target active power of the station, an available active capacity allocated to the array A is 2.9 MW, and an available active capacity allocated to the array B is 2.5 MW.

After the available active capacities are allocated to the arrays, the available reactive capacities are allocated to the arrays. Because a sum of a square of an available active capacity and a square of an available reactive capacity is a square of apparent power, and the apparent power remains unchanged, available reactive capacities of the arrays can be obtained based on apparent power and the allocated available active capacities of the arrays.

After the available reactive capacities of the N arrays requiring power coordination are obtained, it needs to be determined whether a total available reactive capacity of the N arrays can meet target reactive power of the station. The following separately describes two cases in which the total available reactive capacity of the N arrays can meet the target reactive power of the station and the total available reactive capacity of the N arrays cannot meet the target reactive power of the station.

Case 1: The total available reactive capacity of the N arrays is greater than or equal to the target reactive power.

The target reactive power is allocated to the N arrays based on ratios of the available reactive capacities of the arrays to the total available reactive capacity of the N arrays.

The following provides descriptions by using a $j^{th}$ array as an example.

The available reactive capacities of the arrays are allocated based on the ratios, as shown in the following formula:

$$P_{send-A-j} = \frac{P_{A-j-max}}{P_{norm-max-all}} \times P_{norm-target}, \quad (10)$$

where $P_{send-A-j}$ is a target value of an available reactive capacity allocated to the $j^{th}$ array, $P_{A-j-max}$ is an available reactive capacity of the $j^{th}$ array, $P_{norm-max-all}$ is the total available reactive capacity of the N arrays, and $P_{norm-target}$ is the target reactive power of the photovoltaic station.

Case 2: The total available reactive capacity of the N arrays is less than the target reactive power.

When the total available reactive capacity of the N arrays cannot meet the target reactive power of the station, full-amount allocation is performed based on the available reactive capacities respectively corresponding to the N arrays.

For related parts, refer to the case 2 in which the photovoltaic station allocates the available active capacities to the arrays. Details are not described herein.

The foregoing describes a case in which the photovoltaic station first allocates the available active capacities to the arrays and then allocates the available reactive capacities to the arrays, namely, the first case. The following describes a case in which the photovoltaic station first allocates the available reactive capacities to the arrays and then allocates the available active capacities to the arrays, namely, the second case.

The second case is basically the same as the first case, and a difference lies in that when a total available reactive capacity of the N arrays is less than target reactive power, some available active capacities need to be sacrificed to meet a case in which the available reactive capacities reach the target reactive power of the station. Same parts are not described again, and the following describes the difference.

After available reactive capacities of the N arrays requiring power coordination are obtained, it needs to be determined whether the total available reactive capacity of the N arrays can meet the target reactive power of the station. The following separately describes two cases in which the total available reactive capacity of the N arrays can meet the target reactive power of the station and the total available reactive capacity of the N arrays cannot meet the target reactive power of the station.

Case 1: The total available reactive capacity of the N arrays is less than the target reactive power.

Full-amount allocation is first performed based on the available reactive capacities respectively corresponding to the N arrays, and then reactive power is allocated in descending order of power factors of the N arrays, until all the target reactive power is allocated. Allocated reactive power of each of the N arrays is less than or equal to maximum apparent power of the array.

When the total available reactive capacity of the N arrays is less than the target reactive power, some available active capacities need to be sacrificed to meet a target that the available active capacities can reach the target reactive power of the station. The sacrificed available active capacity only needs to meet a case in which reactive power of the array is equal to maximum apparent power of the array.

For an implementation, refer to the embodiment shown in FIG. 9. Details are not described herein again.

Case 2: The total available reactive capacity of the N arrays is greater than or equal to the target reactive power.

The target active power is allocated to the N arrays based on ratios of the available reactive capacities of the arrays to the total available reactive capacity of the N arrays.

For an implementation, refer to the foregoing case 1 in which the photovoltaic station allocates the available reactive capacities to the arrays. Details are not described herein again.

After the available reactive capacities are allocated to the arrays, the available active capacities are allocated to the arrays. Because a sum of a square of an available active capacity and a square of an available reactive capacity is a square of apparent power, and the apparent power remains unchanged, available active capacities of the arrays can be obtained based on apparent power and the allocated available reactive capacities of the arrays. For related parts, refer to the method for allocating the available active capacities in the first case of this embodiment. Details are not described herein again.

The power coordination method for the photovoltaic station provided in this embodiment of this application is applicable to a case in which the arrays in the photovoltaic station have a same priority, in other words, the arrays have no priorities. The photovoltaic station first obtains different available power capacities of all the arrays, that is, first obtains power generation capabilities of all the arrays; and performs differential power allocation based on the power generation capacities of the arrays. Compared with even power allocation, the method can improve an electric energy yield.

Embodiment 7 of a Power Coordination Method for a Photovoltaic Station

According to the power coordination method for the photovoltaic station provided in this embodiment of this application, the photovoltaic station obtains available active capacities of arrays by using sample inverters; then differentially coordinates power of the arrays based on target active power of the station and priorities of the arrays; and finally differentially coordinates power of each inverter in the arrays based on an available power capacity of each inverter.

Figure 14:
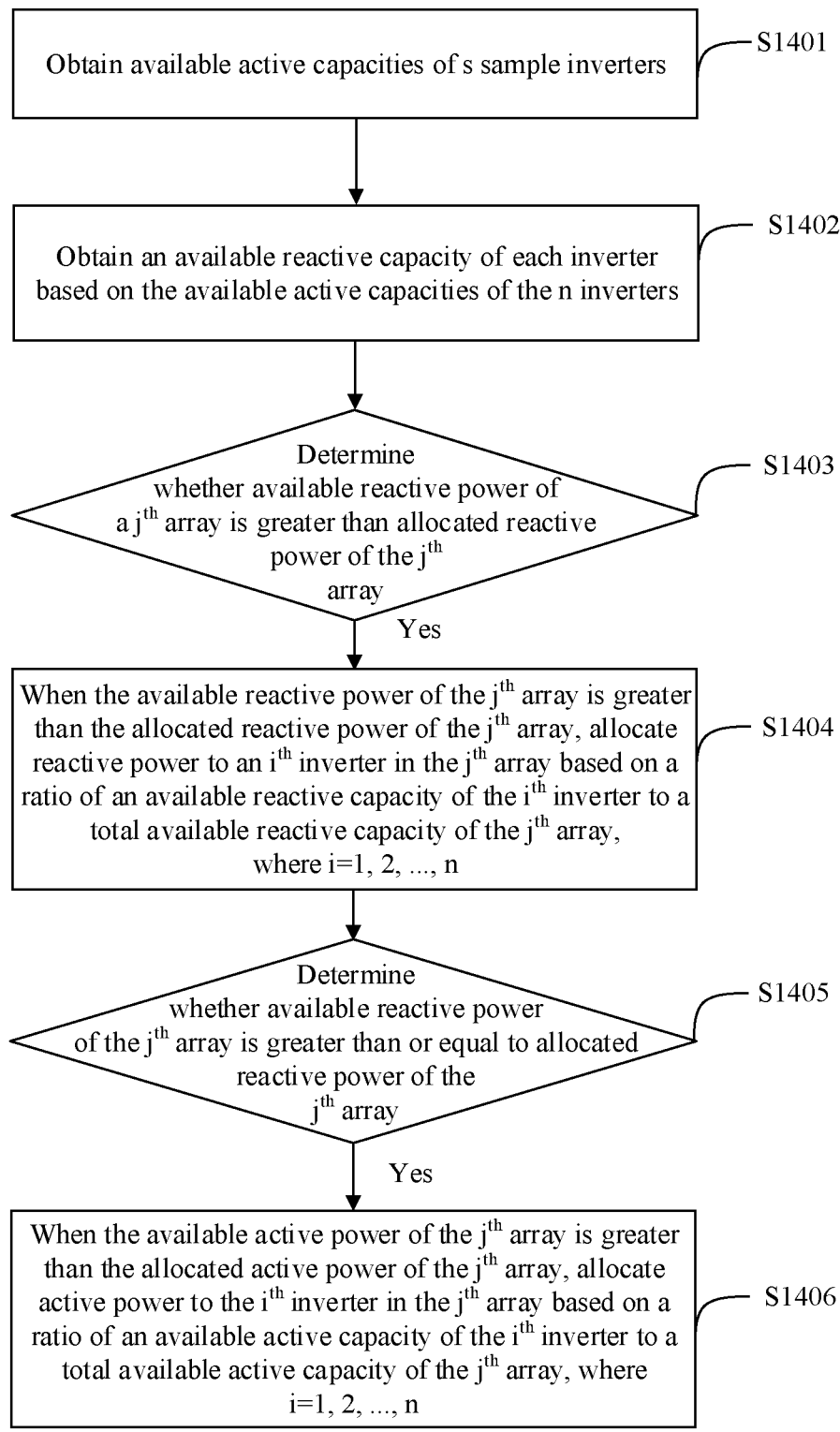
FIG. 14 is a flowchart of yet another power coordination method for a photovoltaic station according to an embodiment of this application.

FIG. 14 is a flowchart of yet another power coordination method for a photovoltaic station according to an embodiment of this application.

S1401: Obtain available active capacities of n inverters.

S1402: Obtain an available reactive capacity of each inverter based on the available active capacities of the n inverters.

S1403: Determine whether available reactive power of a $j^{th}$ array is greater than or equal to allocated reactive power of the $j^{th}$ array; and if yes, perform S1404.

After reactive power of the inverter is adjusted, the reactive power changes. Because maximum apparent power remains unchanged, an active capacity of the array needs to be newly obtained to adjust active power of the inverter.

The following provides detailed descriptions by using any array, the $j^{th}$ array, requiring power adjustment as an example.

S1404: When the available reactive power of the $j^{th}$ array is greater than or equal to the allocated reactive power of the $j^{th}$ array, allocate reactive power to an $i^{th}$ inverter in the $j^{th}$ array based on a ratio of an available reactive capacity of the $i^{th}$ inverter to a total available reactive capacity of the $j^{th}$ array, where i=1, 2, . . . , n.

Allocation is performed based on the ratio of the available reactive capacity of the $i^{th}$ inverter to the total available reactive capacity of the $j^{th}$ array, as shown in the following formula:

$$Q_{send-A-j} = \frac{Q_{A-i-max}}{Q_{norm-max-all}} \times Q_{norm-target}, \quad (11)$$

where
$Q_{send-A-i}$ is a target value of an available reactive capacity allocated to the $i^{th}$ inverter, $Q_{A-i-max}$ is the available reactive capacity of the $i^{th}$ inverter, $Q_{norm-max-all}$ is an accumulated value of available reactive capacities of to-be-optimized inverters, and $Q_{norm-target}$ is a total to-be-allocated available reactive capacity of the $j^{th}$ array For details of adjusting the reactive power of the inverter in this embodiment, refer to adjusting the reactive power of the array in the embodiment 3 of this application. Related parts are not described again.

A method for coordinating power of the inverter when the available reactive power of the $j^{th}$ array is less than the allocated reactive power of the $j^{th}$ array is not limited in this embodiment of this application. For example, reference may be made to the method for coordinating the power of the array in the embodiment 3 of this application. For another example, reactive power of the inverter may be obtained through even allocation.

S1405: Determine whether available active power of the $j^{th}$ array is greater than or equal to allocated active power of the $j^{th}$ array; and if yes, perform S1406.

After the reactive power of the inverter is adjusted, the reactive power changes. Because the maximum apparent power remains unchanged, an active capacity of the inverter needs to be newly obtained to adjust the active power of the inverter.

S1406: When the available active power of the $j^{th}$ array is greater than or equal to the allocated active power of the $j^{th}$ array, allocate active power to the $i^{th}$ inverter in the $j^{th}$ array based on a ratio of an available active capacity of the $i^{th}$ inverter to a total available active capacity of the $j^{th}$ array, where i=1, 2, . . . , n.

Allocation is performed based on the ratio of the available active capacity of the $i^{th}$ inverter to the total available active capacity of the $j^{th}$ array, as shown in the following formula:

$$P_{send-A-i} = \frac{P_{A-i-max}}{P_{norm-max-all}} \times P_{norm-target}, \quad (12)$$

where $P_{send-A-i}$ is a target value of an available active capacity allocated to the $i^{th}$ inverter, $P_{A-i-max}$ is the available active capacity of the $i^{th}$ inverter, $P_{norm-max-all}$ is an accumulated value of available active capacities of the to-be-optimized inverters, and is $P_{norm-target}$ is a total to-be-allocated available reactive capacity of the $j^{th}$ array.

For details of adjusting the active power of the inverter in this embodiment, refer to adjusting the active power of the array in the embodiment 3 of this application. Related parts are not described again.

A method for coordinating power of the inverter when the available active power of the $j^{th}$ array is less than the allocated active power of the $j^{th}$ array is not limited in this embodiment of this application. For example, reference may be made to the method for coordinating the power of the array in the embodiment 3 of this application. For another example, active power of the inverter may be obtained through even allocation.

According to the power coordination method for the photovoltaic station provided in this application, the sample inverters come from the arrays requiring power adjustment, so that differences between inverters and differences between the arrays can be fully exploited. After an available power capacity of the photovoltaic station is obtained by using real-time active power of the sample inverters, inverter power allocation can be dynamically adjusted, to increase an electric energy yield, fully utilize the available active capacities and available reactive capacities of the arrays, and maximize a power range.

Embodiment 1 of a Photovoltaic Station

Based on the power coordination methods for the photovoltaic station provided in the foregoing embodiments, an embodiment of this application further provides a photovoltaic station. All the power coordination methods for the photovoltaic station provided in embodiments of this application can be applied to the photovoltaic station provided in this embodiment of this application. The following provides detailed descriptions with reference to the accompanying drawings.

Figure 15:
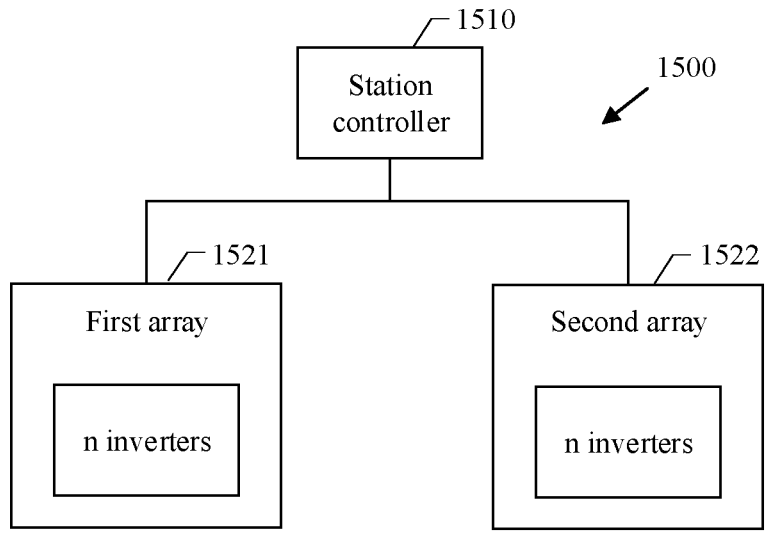
FIG. 15 is a diagram of another photovoltaic station according to an embodiment of this application.

FIG. 15 is a diagram of another photovoltaic station 1500 according to an embodiment of this application.

The photovoltaic station 1500 includes a station controller 1510, a first array, a second array, . . . , and a $M^{th}$ array. In the figure, only a first array 1521 and a second array 1522 are used as an example for description, and other arrays are not shown.

N arrays in the M arrays require power coordination. In this embodiment of this application, a quantity of arrays in the photovoltaic station 1500 is not limited, and a quantity of arrays requiring power coordination is also not limited, that is, both M and N are positive integers. The arrays requiring coordination may be all the arrays or some arrays in the photovoltaic station, that is, N is less than or equal to M.

Each array includes a plurality of inverters. In this embodiment of this application, a quantity of inverters in the array is not limited, and a running status of the inverter is also not limited. For example, inverters in the array may be partially faulty or may all normally work, but all selected sample inverters are normally-working inverters.

The station controller 1510 may be an independent module, or may be integrated into various types of hardware in the photovoltaic station. A type of hardware is not limited in this embodiment of this application. For example, the hardware may be a photovoltaic area monitor, a photovoltaic automatic power generation control system, a photovoltaic automatic voltage control system, a new energy monitor, a new energy fast frequency modulation apparatus, an optical energy storage element energy management system, or a photovoltaic station data collection and monitoring control system.

A type of the inverter is not limited in this embodiment of this application. For example, the inverter may be a photovoltaic string inverter, a centralized photovoltaic inverter, a distributed photovoltaic inverter, or a bidirectional photovoltaic inverter.

The following provides detailed descriptions by using any array, a $j^{th}$ array, requiring power adjustment as an example, where j=1, 2, . . . , N.

The $j^{th}$ array includes n normally-running inverters, and n is a positive integer. s sample inverters are set in the n normally-running inverters. The sample inverter is always in a natural maximum power generation state, that is, an available power capacity of the sample inverter is neither restricted nor controlled, and the sample inverter does not participate in power adjustment.

A quantity of sample inverters is not limited in this embodiment of this application, that is, s is a positive integer, and s is less than n. For example, a value range of the quantity of sample inverters is 5% n≤s≤15% n. A person skilled in the art may set the quantity of sample inverters based on an actual requirement. A larger quantity of sample inverters indicates a more accurate obtained available power capacity. However, a larger quantity of sample inverters causes an increase in calculation complexity, and the quantity of sample inverters may be selected based on calculation complexity and accuracy.

Sample inverters are deployed in each array requiring power coordination, and sample inverters are not concentrated in one sample array any more, but distributed in the arrays requiring power coordination in the photovoltaic station. Compared with obtaining available active capacities based on a sample array, in this embodiment of this application, the sample inverters are more evenly and widely distributed, and obtained available active capacities are more accurate, that is, the sample inverter is more representative than the sample array. Because the sample inverters come from the arrays requiring power adjustment, differences between inverters and differences between the arrays can be fully exploited, and available active capacities of the arrays can be more accurately obtained by using the sample inverters. Therefore, a more accurate available power capacity of the photovoltaic station 1500 is obtained by using relatively accurate available active capacities.

The following describes an application scenario of the station controller in detail.

After obtaining an available active capacity of the $j^{th}$ array in the N arrays based on real-time active power of the s sample inverters, and obtaining available active capacities of all the arrays (N arrays in total) in the photovoltaic station, the station controller 1510 allocates active power to the N arrays based on the available active capacities respectively corresponding to the N arrays. For implementations and examples of the station controller, refer to the foregoing embodiments of the power coordination methods for the photovoltaic station. Details are not described herein again.

According to the photovoltaic station 1500 provided in this embodiment of this application, the available power capacity of the photovoltaic station 1500 is not obtained based on available active capacities of all inverters in one sample array any more, but the sample inverters are disposed in the arrays requiring power coordination. The sample inverters are not concentrated in one array anymore, but distributed in the arrays requiring power coordination. The sample inverters come from the arrays requiring power adjustment, so that differences between inverters and differences between the arrays can be fully exploited, and the available active capacities of the arrays can be more accurately obtained by using the sample inverters. Therefore, the further obtained available power capacity of the photovoltaic station 1500 is also more accurate. Therefore, a more accurate available power capacity of the photovoltaic station 1500 can be obtained by using the real-time active power of the sample inverters.

Embodiment 2 of a Photovoltaic Station

The photovoltaic station 1500 provided in this embodiment of this application includes not only a station controller, but also an array controller. The station controller obtains available power capacities of the arrays by using the array controller, and allocates active power and reactive power to corresponding arrays based on target active power and target reactive power of the station and priorities of the arrays, to differentially coordinate power of the arrays.

The array controller may be an independent module and located in the array, or may be integrated into the station controller. A type of the array controller is not limited in this embodiment of this application. For example, the array controller may be a data collector, a box-type transformer measurement and control unit, a matrix communication unit, a new energy power generation unit control apparatus, or an all-in-one apparatus for protection, measurement, control, and communication.

The following provides detailed descriptions by using an example in which the array controller is independent of the station controller and is located in the array.

A quantity of array controllers is not limited in this embodiment of this application. For example, one array controller is configured for a plurality of arrays. For another example, one array controller is configured for one array. The following provides detailed descriptions by using an example in which one array controller controls one array.

Figure 16:
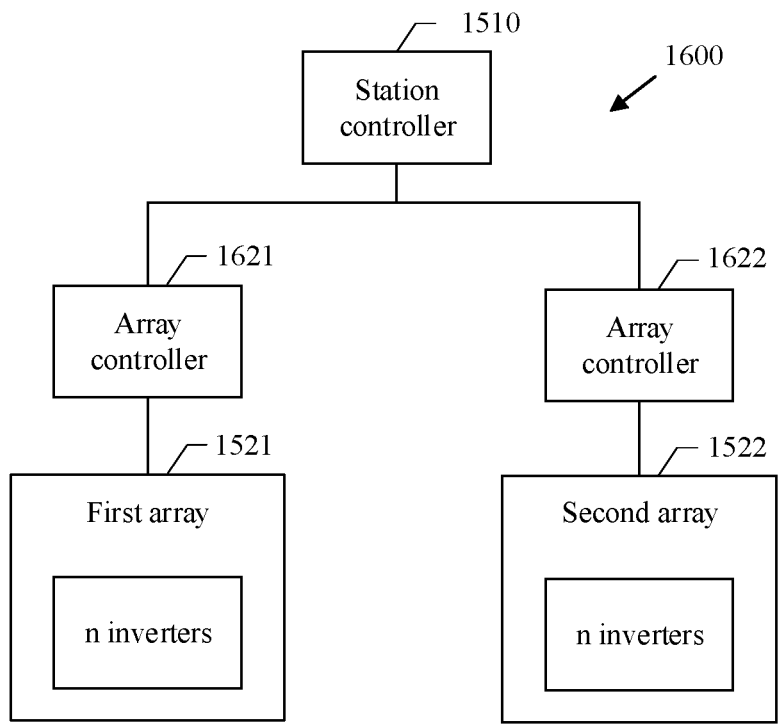
FIG. 16 is a diagram of still another photovoltaic station according to an embodiment of this application.

FIG. 16 is a diagram of still another photovoltaic station 1600 according to an embodiment of this application.

The photovoltaic station 1600 includes a station controller 1510, a first array, a second array, . . . , and a $M^{th}$ array. In the figure, only a first array 1521 and a second array 1522 are used as an example for description, and other arrays are not shown. For related parts, refer to the embodiment shown in FIG. 15. Details are not described herein again.

A first array controller 1621 is configured for the first array 1521, and a second array controller 1622 is configured for the second array 1522.

The following provides detailed descriptions by using the first array controller 1621 as an example.

The array controller 1621 is configured to obtain average active power of a $j^{th}$ array based on real-time active power of s sample inverters; and obtain an available active capacity of the $j^{th}$ array based on the average active power of the $j^{th}$ array and n.

The array controller 1621 is configured to obtain not only the available active capacity of the array, but also an available reactive capacity of the array. The array controller 1621 obtains the available reactive capacity of the $j^{th}$ array based on the real-time active power of the s sample inverters, maximum apparent power of the sample inverter, and n.

A manner of obtaining the available active capacity and the available reactive capacity of the array is not limited in this embodiment of this application. For example, the available active capacity and the available reactive capacity of the array may be obtained by the array controller. For another example, the available active capacity and the available reactive capacity of the array may be obtained by the station controller.

The following provides descriptions by using an example in which the array controller obtains the available active capacity and the available reactive capacity of the array.

After obtaining an available active capacity and an available reactive capacity of an array, the array controller 1621 or 1622 sends the data to the station controller 1510. The station controller 1510 allocates an available active capacity and an available reactive capacity to the array based on the available active capacity and the available reactive capacity of the array.

A manner in which the photovoltaic station 1600 differentially coordinates power of the arrays is not limited in this embodiment of this application. The following provides detailed descriptions by using an example in which the photovoltaic station 1600 adjusts the power of the arrays according to a priority sequence.

The station controller 1510 is configured to allocate active power to N arrays based on target active power of the station, priorities of the N arrays, and available active capacities respectively corresponding to the N arrays.

The station controller 1510 is configured to allocate not only the active power but also reactive power to the arrays. The station controller 1510 allocates the reactive power to the N arrays based on target reactive power of the station, the priorities of the N arrays, and available reactive capacities respectively corresponding to the N arrays.

A manner of setting the priorities of the arrays is not limited in this embodiment of this application. For example, the priorities of the arrays may be preset and stored in the station controller. For another example, the priorities of the arrays may be set in real time and stored in the station controller.

In this embodiment of this application, the priorities of the arrays are set, so that an array having a special requirement can be preferentially met. For example, the priorities of the arrays may be set to 1, 2, 3, 4, 5, and the like. A larger number indicates a higher priority. Based on the priorities, full-amount arrangement is preferentially made for an array with a relatively high priority to participate in allocation of available active power.

The priorities of the arrays in the photovoltaic station 1600 are not limited in this embodiment of this application. For example, all the arrays in the photovoltaic station 1600 have a same priority. For another example, two levels, namely, a priority level and a common level, may be set to determine whether an array in the photovoltaic station 1600 has a special requirement.

For implementations and examples of the station controller and the array controller, refer to the foregoing embodiments of the power coordination methods for the photovoltaic station. Details are not described herein again.

According to the photovoltaic station 1600 provided in this application, the photovoltaic station 1600 first obtains different available power capacities of all the arrays, that is, first obtains power generation capabilities of all the arrays; and performs differential power allocation based on the power generation capabilities of the arrays and the priorities of the arrays, so that power can be preferentially allocated to an array with a relatively high priority while the power generation capabilities of the arrays are fully exerted. Compared with even power allocation, the method can improve an electric energy yield.

Embodiment 3 of a Photovoltaic Station

According to the photovoltaic station provided in this application, a station controller first adjusts available reactive capacities, and then adjusts available active capacities, so that when the available reactive capacities of arrays are less than target reactive power of the station, available active capacities of some arrays can be scarified to enable the available reactive capacities to reach the target reactive power of the station, thereby reducing energy consumption, improving grid voltage quality, reducing a penalty, and increasing a revenue.

N arrays requiring power coordination have at least arrays of two different priorities: arrays of a first priority and arrays of a second priority, where the first priority is higher than the second priority.

The following provides descriptions with reference to the diagram of the photovoltaic station 1500 provided in FIG. 15.

Two cases in which the station controller allocates available reactive capacities to the arrays are obtained through classification based on whether a total available reactive capacity of the N arrays is greater than or equal to the target reactive power of the station 1500. The following separately describes the two cases.

First case: The total available reactive capacity of the N arrays is greater than or equal to the target reactive power.

The station controller 1510 determines whether a total available reactive capacity of the arrays of the first priority is greater than or equal to the target reactive power of the station 1500.

If yes, the target reactive power is allocated to the arrays of the first priority based on ratios of available reactive capacities of the arrays to the total available reactive capacity of the arrays of the first priority.

If no, full-amount allocation is performed on the arrays of the first priority based on available reactive capacities of the arrays, and reactive power that is of the target reactive power and that remains after allocation is performed on the first priority is allocated to the arrays of the second priority based on ratios of available reactive capacities of the arrays to a total available reactive capacity of the arrays of the second priority.

After the available reactive capacities are allocated, available active capacities may be allocated. Two cases in which the station controller 1510 allocates the available active capacities to the arrays are obtained through classification based on whether a total available active capacity of the N arrays is greater than or equal to target active power of the station 1500. The following separately describes the two cases.

Case 1: The total available active capacity of the N arrays is greater than or equal to the target active power.

The station controller 1510 determines whether a total available active capacity of the N arrays is greater than or equal to the target active power of the station 1500.

If yes, the target active power is allocated to the arrays of the first priority based on ratios of available active capacities of the arrays to the total available active capacity of the arrays of the first priority.

If no, full-amount allocation is performed on the arrays of the first priority based on available active capacities of the arrays, and active power that is of the target active power and that remains after allocation is performed on the first priority is allocated to the arrays of the second priority based on ratios of available active capacities of the arrays to a total available active capacity of the arrays of the second priority.

Case 2: The total available active capacity of the N arrays is less than the target active power.

The station controller 1510 first performs full-amount allocation based on available active capacities respectively corresponding to the N arrays. The following continues to describe the second case.

Second case: The total available reactive capacity of the N arrays is less than the target reactive power.

The station controller 1510 first performs full-amount allocation based on available reactive capacities respectively corresponding to the N arrays, and then allocates reactive power in descending order of power factors of the N arrays, until all the target reactive power of the station 1500 is allocated.

Compared with available reactive capacities obtained based on available active capacities, there is a change for available reactive capacities obtained after adjustment is performed based on the power factors. However, because maximum apparent power remains unchanged, the available active capacities also change with the available reactive capacities. To achieve a more stable grid voltage, active power is scarified to preferentially meet reactive power allocation. Therefore, the available active capacities need to be newly adjusted based on the maximum apparent power and allocated available reactive capacities.

The station controller 1510 obtains an updated available active capacity of a $j^{th}$ array based on allocated reactive power of the $j^{th}$ array in the N arrays and maximum apparent power of the $j^{th}$ array.

Two cases in which the station controller 1510 allocates available active capacities to the arrays are obtained through classification based on whether an updated total available active capacity of the N arrays is greater than or equal to the target active power of the station 1500. The following separately describes the two cases.

Case 1: The updated total available active capacity of the N arrays is greater than or equal to the target active power.

The station controller 1510 determines whether an updated total available active capacity of the arrays of the first priority is greater than or equal to the target active power of the station 1500.

If yes, the target active power is allocated to the arrays of the first priority based on ratios of updated available active capacities of the arrays to the updated total available active capacity of the arrays of the first priority.

If no, full-amount allocation is performed on the arrays of the first priority based on updated available active capacities of the arrays, and active power that is of the target active power and that remains after allocation is performed on the first priority is allocated to the arrays of the second priority based on ratios of updated available active capacities of the arrays to an updated total available active capacity of the arrays of the second priority.

Case 2: The updated total available active capacity of the N arrays is less than the target active power.

When the updated total available active capacity of the N arrays is less than the target active power of the station, the station controller 1510 performs full-amount allocation based on updated available active capacities respectively corresponding to the N arrays.

For implementations and examples of the station controller, refer to the foregoing embodiments of the power coordination methods for the photovoltaic station. Details are not described herein again.

According to the foregoing method, the photovoltaic station first adjusts the available reactive capacities, and then adjusts the available active capacities, so that when the available reactive capacities of the arrays are lower than the target reactive power of the station, available active capacities of some arrays can be scarified to enable reactive power to reach the target reactive power of the station, thereby reducing energy consumption, improving grid voltage quality, reducing a penalty, and increasing a revenue. In addition, a target power value of the station is reached at the first time the photovoltaic station allocates power. However, in an even power allocation method, a target power value of the station can be reached only by performing a plurality of rounds of fine adjustment. Compared with the even power allocation method, the method greatly reduces power coordination response time of the photovoltaic station, reduces or eliminates related assessment and a resulting power loss, and increases a revenue.

Embodiment 4 of a Photovoltaic Station

In the embodiment 2 of the photovoltaic station and the embodiment 3 of the photovoltaic station, the photovoltaic station allocates the available active capacities and the available reactive capacities to the corresponding arrays based on the priorities of the arrays. This embodiment of this application describes a manner in which the photovoltaic station allocates available active capacities and available reactive capacities to arrays when the arrays in the photovoltaic station have a same priority, in other words, the arrays in the photovoltaic station have no priorities.

There are two cases in which the photovoltaic station allocates the available active capacities and the available reactive capacities to the arrays. In the first case, the photovoltaic station first allocates the available active capacities to the arrays and then allocates the available reactive capacities to the arrays. In the second case, the photovoltaic station first allocates the available reactive capacities to the arrays and then allocates the available active capacities to the arrays.

The following first describes the first case. Reference may be still made to FIG. 15.

After available active capacities of N arrays requiring power coordination are obtained, it needs to be determined whether a total available active capacity of the N arrays can meet target active power of the station 1500. The following separately describes two cases in which the total available active capacity of the N arrays can meet the target active power of the station 1500 and the total available capacity of the N arrays cannot meet the target active power of the station 1500.

Case 1: The total available active capacity of the N arrays is greater than or equal to the target active power.

The station controller 1510 allocates the target active power to the N arrays based on ratios of the available active capacities of the N arrays to the total available active capacity of the N arrays.

Case 2: The total available active capacity of the N arrays is less than the target active power.

When the total available active capacity of the N arrays cannot meet the target active power of the station 1500, the station controller 1510 performs full-amount allocation based on the available active capacities respectively corresponding to the N arrays.

After available reactive capacities of the N arrays requiring power coordination are obtained, it needs to be determined whether a total available reactive capacity of the N arrays can meet target reactive power of the station 1500. The following separately describes two cases in which the total available reactive capacity of the N arrays can meet the target reactive power of the station 1500 and the total available reactive capacity of the N arrays cannot meet the target reactive power of the station 1500.

Case 1: The total available reactive capacity of the N arrays is greater than or equal to the target reactive power.

The station controller 1510 allocates the target reactive power to the N arrays based on ratios of the available reactive capacities of the arrays to the total available reactive capacity of the N arrays.

Case 2: The total available reactive capacity of the N arrays is less than the target reactive power.

When the total available reactive capacity of the N arrays cannot meet the target reactive power of the station 1500, the station controller 1510 performs full-amount allocation based on the available reactive capacities respectively corresponding to the N arrays.

The foregoing describes a case in which the station controller 1510 first allocates the available active capacities to the arrays and then allocates the available reactive capacities to the arrays, namely, the first case. The following describes a case in which the station controller 1510 first allocates the available reactive capacities to the arrays and then allocates the available active capacities to the arrays, namely, the second case.

The second case is basically the same as the first case, and a difference lies in that when a total available reactive capacity of the N arrays is less than target reactive power, some available active capacities need to be sacrificed to meet a case in which the available reactive capacities reach the target reactive power of the station 1500. Same parts are not described again, and the following describes the difference.

After obtaining available reactive capacities of the N arrays requiring power coordination, the station controller 1510 needs to determine whether a total available reactive capacity of the N arrays can meet target reactive power of the station 1500. The following separately describes two cases in which the total available reactive capacity of the N arrays can meet the target reactive power of the station 1500 and the total available reactive capacity of the N arrays cannot meet the target reactive power of the station 1500.

Case 1: The total available reactive capacity of the N arrays is less than the target reactive power.

The station controller 1510 first performs full-amount allocation based on the available reactive capacities respectively corresponding to the N arrays, and then allocates reactive power in descending order of power factors of the N arrays, until all the target reactive power is allocated. Allocated reactive power of each of the N arrays is less than or equal to maximum apparent power of the array.

When the total available reactive capacity of the N arrays is less than the target reactive power, some available active capacities need to be sacrificed to meet a target that the available active capacities can reach the target reactive power of the station 1500. The sacrificed available active capacity only needs to meet a case in which reactive power of the array is equal to maximum apparent power of the array.

Case 2: The total available reactive capacity of the N arrays is greater than or equal to the target reactive power.

The station controller 1510 allocates the target active power to the N arrays based on ratios of the available reactive capacities of the arrays to the total available reactive capacity of the N arrays.

After allocating the available reactive capacities to the arrays, the station controller 1510 allocates the available active capacities to the arrays. Because a sum of a square of an available active capacity and a square of an available reactive capacity is a square of apparent power, and the apparent power remains unchanged, available active capacities of the arrays can be obtained based on apparent power and the allocated available reactive capacities of the arrays. For related parts, refer to the method for allocating the available active capacities in the first case of this embodiment. Details are not described herein again.

For implementations and examples of the station controller 1510, refer to the foregoing embodiments of the power coordination methods for the photovoltaic station 1500. Details are not described herein again.

The photovoltaic station 1500 provided in this embodiment of this application is applicable to a case in which the arrays in the photovoltaic station 1500 have a same priority, in other words, the arrays have no priorities. The photovoltaic station 1500 first obtains different available power capacities of all the arrays, that is, first obtains power generation capabilities of all the arrays; and performs differential power allocation based on the power generation capacities of the arrays. Compared with even power allocation, the method can improve an electric energy yield.

Embodiment 5 of a Photovoltaic Station

According to the photovoltaic station provided in this application, an array controller obtains available active capacities of arrays by using sample inverters; then differentially coordinates power of the arrays based on target active power of the station and priorities of the arrays; and finally differentially coordinates power of each inverter in the arrays based on an available power capacity of each inverter.

The following provides detailed descriptions by using any array, a $j^{th}$ array, requiring power adjustment as an example.

When available reactive power of the $j^{th}$ array is greater than or equal to allocated reactive power of the $j^{th}$ array, the array controller allocates reactive power to an $i^{th}$ inverter in the $j^{th}$ array based on a ratio of an available reactive capacity of the $i^{th}$ inverter to a total available reactive capacity of the $j^{th}$ array, where i=1, 2, . . . , n. For details, refer to the formula (11). Details are not described herein again.

A method for coordinating power of the inverter when the available reactive power of the $j^{th}$ array is less than the allocated reactive power of the $j^{th}$ array is not limited in this embodiment of this application. For example, reference may be made to the method for coordinating the power of the array in the embodiment 3 of this application. For another example, reactive power of the inverter may be obtained through even allocation.

The array controller can allocate not only the reactive power but also active power to the inverter. When available active power of the $j^{th}$ array is greater than or equal to allocated active power of the $j^{th}$ array, the array controller allocates active power to the $i^{th}$ inverter in the $j^{th}$ array based on a ratio of an available active capacity of the $i^{th}$ inverter to a total available active capacity of the $j^{th}$ array, where i=1, 2, . . . , n. For details, refer to the formula (12). Details are not described herein again.

A method for coordinating power of the inverter when the available active power of the $j^{th}$ array is less than the allocated active power of the $j^{th}$ array is not limited in this embodiment of this application. For example, reference may be made to the method for coordinating the power of the array in the embodiment 3 of this application. For another example, active power of the inverter may be obtained through even allocation.

The following provides descriptions with reference to the diagram of the photovoltaic station 1600 provided in FIG. 16.

When available reactive power of the first array 1521 is greater than or equal to allocated reactive power of the first array 1521, a first array controller 1621 allocates reactive power to each inverter in the first array 1521 based on a ratio of an available reactive capacity of the inverter to a total available reactive capacity of the first array 1521.

Likewise, when available active power of the first array 1521 is greater than or equal to allocated active power of the first array 1521, the first array controller 1621 allocates active power to each inverter in the first array 1521 based on a ratio of an available active capacity of the inverter to a total available active capacity of the first array 1521.

For implementations and examples of the array controller, refer to the foregoing embodiments of the power coordination methods for the photovoltaic station 1600. Details are not described herein again.

According to the power coordination method for the photovoltaic station provided in this application, the sample inverters come from the arrays requiring power adjustment, so that differences between inverters and differences between the arrays can be fully exploited. After an available power capacity of the photovoltaic station is obtained by using real-time active power of the sample inverters, inverter power allocation can be dynamically adjusted, to increase an electric energy yield, fully utilize the available active capacities and available reactive capacities of the arrays, and maximize a power range.

It should be understood that, in this application, "at least one (item)" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A power coordination method for a photovoltaic station comprising M arrays, the method comprising:

allocating active power to N arrays of the M arrays based on a target active power of the photovoltaic station, priorities of the N arrays, and the available active capacities corresponding to the N arrays, the N arrays comprising at least arrays of a first priority and arrays of a second priority, wherein the first priority is higher than the second priority, the N arrays in the M arrays requiring power coordination, a $j^{th}$ array in the N arrays comprises n normally-running inverters and j=1, 2, . . . , N, the n inverters comprise s sample inverters, M, N, n and s are positive integers, N is less than or equal to M, s is less than n, and an available active capacity of a $j^{th}$ array in the N arrays being obtained based on real-time active power of the s sample inverters; and allocating a target reactive power to arrays of the first priority based on ratios of available reactive capacities of the arrays of the first priority to a total first priority available reactive capacity of the arrays of the first priority when a total available reactive capacity of the N arrays is greater than or equal to the target reactive power and a total available reactive capacity of the arrays of the first priority is greater than or equal to the target reactive power, an available reactive capacity of the $j^{th}$ array in the N arrays being obtained based on the real-time active power of the s sample inverters.

2. The method according to claim 1, wherein the available active capacities being obtained based on the real-time active power of the s sample inverters comprises:

obtaining average active power of the $j^{th}$ array based on the real-time active power of the s sample inverters; and obtaining the available active capacity of the $j^{th}$ array based on the average active power of the $j^{th}$ array and n.

3. The method according to claim 1, wherein the available reactive capacities being obtained based on the real-time active power of the s sample inverters comprises:

obtaining the available reactive capacity of the $j^{th}$ array based on the real-time active power of the s sample inverters, a maximum apparent power of the sample inverter, and n.

4. The method according to claim 1, wherein the allocating the target reactive power to the arrays of the first priority comprises:

when a total available reactive capacity of the N arrays is greater than or equal to the target reactive power, and a total available reactive capacity of the arrays of the first priority is less than the target reactive power, performing full-amount allocation on the arrays of the first priority based on available reactive capacities of the arrays, and allocating reactive power of the target reactive power that remains after allocation is performed on the first priority, to the arrays of the second priority based on ratios of available reactive capacities of the arrays to a total available reactive capacity of the arrays of the second priority.

5. The method according to claim 1, wherein the allocating the active power to the N arrays comprises:

when a total available active capacity of the N arrays is greater than or equal to the target active power, and a total available active capacity of the arrays of the first priority is greater than or equal to the target active power, allocating the target active power to the arrays of the first priority based on ratios of available active capacities of the arrays to the total available active capacity of the arrays of the first priority.

6. The method according to claim 1, wherein the allocating the active power to the N arrays comprises:

when a total available active capacity of the N arrays is greater than or equal to the target active power, and a total available active capacity of the arrays of the first priority is less than the target active power, performing the full-amount allocation on the arrays of the first priority based on available active capacities of the arrays, and allocating active power of the target active power that remains after allocation is performed on the first priority, to the arrays of the second priority based on ratios of available active capacities of the arrays to a total available active capacity of the arrays of the second priority.

7. The method according to claim 1, wherein the allocating the active power to the N arrays comprises:

when a total available active capacity of the N arrays is less than the target active power, performing the full-amount allocation based on the available active capacities corresponding to the N arrays.

8. The method according to claim 1, wherein the allocating the target reactive power to the arrays of the first priority comprises:

when the total available reactive capacity of the arrays of the first priority is less than the target reactive power, first performing full-amount allocation based on the available reactive capacities corresponding to the N arrays, and then allocating reactive power in descending order of power factors of the N arrays, until all the target reactive power is allocated.

9. The method according to claim 8, wherein the allocating the active power to the N arrays comprises:

obtaining an updated available active capacity of the $j^{th}$ array based on allocated reactive power of the $j^{th}$ array in the N arrays and a maximum apparent power of the $j^{th}$ array; and when an updated total available active capacity of the N arrays is greater than or equal to the target active power, and an updated total available active capacity of the arrays of the first priority is greater than or equal to the target active power, allocating the target active power to the arrays of the first priority based on ratios of updated available active capacities of the arrays to the updated total available active capacity of the arrays of the first priority.

10. The method according to claim 8, wherein the allocating the active power to the N arrays comprises:
obtaining an updated available active capacity of the $j^{th}$ array based on allocated reactive power of the $j^{th}$ array in the N arrays and a maximum apparent power of the $j^{th}$ array; and
when an updated total available active capacity of the N arrays is greater than or equal to the target active power, and an updated total available active capacity of the arrays of the first priority is less than the target active power, performing full-amount allocation on the arrays of the first priority based on updated available active capacities of the arrays, and allocating active power of the target active power that remains after allocation is performed on the first priority, to the arrays of the second priority based on ratios of updated available active capacities of the arrays to an updated total available active capacity of the arrays of the second priority.

11. The method according to claim 8, wherein the allocating the active power to the N arrays comprises:
obtaining an updated available active capacity of the $j^{th}$ array based on the allocated reactive power of the $j^{th}$ array and a maximum apparent power of the $j^{th}$ array; and
when an updated total available active capacity of the N arrays is less than the target active power, performing the full-amount allocation based on updated available active capacities corresponding to the N arrays.

12. The method according to claim 1, wherein the allocating the active power to the N arrays comprises:
when a total available active capacity of the N arrays is greater than or equal to the target active power, allocating the target active power to the N arrays based on ratios of the available active capacities of the arrays to the total available active capacity of the N arrays; or
when the total available active capacity of the N arrays is less than the target active power, performing the full-amount allocation based on the available active capacities corresponding to the N arrays.

13. The method according to claim 12, wherein the allocating the target reactive power to the arrays of the first priority comprises:
when a total available reactive capacity of the N arrays is greater than or equal to the target reactive power, allocating the target reactive power to the N arrays based on ratios of the available reactive capacities of the arrays to the total available reactive capacity of the N arrays; or
when the total available reactive capacity of the N arrays is less than the target reactive power, performing the full-amount allocation based on the available reactive capacities corresponding to the N arrays.

14. The method according to claim 1, wherein the allocating the target reactive power to the arrays of the first priority comprises:
when a total available reactive capacity of the N arrays is less than the target reactive power, first performing full-amount allocation based on the available reactive capacities corresponding to the N arrays, and then allocating the reactive power in descending order of power factors of the N arrays, until all the target reactive power is allocated, wherein allocated reactive power of each array of the N arrays is less than or equal to maximum apparent power of the array; or
when a total available reactive capacity of the N arrays is greater than or equal to the target reactive power, allocating the target active power to the N arrays based on ratios of the available reactive capacities of the arrays to the total available reactive capacity of the N arrays.

15. The method according to claim 1, further comprising:
when a $j^{th}$ available reactive power of the $j^{th}$ array is greater than or equal to a $j^{th}$ allocated reactive power of the $j^{th}$ array, allocating the reactive power to an $i^{th}$ inverter in the $j^{th}$ array based on a ratio of an available reactive capacity of the $i^{th}$ inverter to a total available reactive capacity of the $j^{th}$ array, wherein i=1, 2, ..., n.

16. The method according to claim 1, further comprising:
when a $i^{th}$ available active power of the $j^{th}$ array is greater than or equal to a $j^{th}$ allocated active power of the $j^{th}$ array, allocating the active power to the $i^{th}$ inverter in the $j^{th}$ array based on a ratio of an available active capacity of the $i^{th}$ inverter to a total available active capacity of the $j^{th}$ array, wherein i=1, 2, ..., n.

17. A photovoltaic station, comprising:
M arrays, N arrays in the M arrays requiring power coordination, a $j^{th}$ array in the N arrays comprises n normally-running inverters and j=1, 2, ..., N, then inverters comprise s sample inverters, M, N, n, and s are positive integers, N is less than or equal to M, and s is less than n; and
a station controller in communication with the M arrays, the station controller:
allocates active power to the N arrays based on a target active power of the photovoltaic station, priorities of the N arrays, and the available active capacities corresponding to the N arrays, the N arrays comprising at least arrays of a first priority and arrays of a second priority, wherein the first priority is higher than the second priority, an available active capacity of the $j^{th}$ array in the N arrays being obtained based on real-time active power of the s sample inverters; and
allocates a target reactive power to arrays of the first priority based on ratios of available reactive capacities of the arrays of the first priority to a total first priority available reactive capacity of the arrays of the first priority when a total available reactive capacity of the N arrays is greater than or equal to the target reactive power and a total available reactive capacity of the arrays of the first priority is greater than or equal to the target reactive power, an available reactive capacity of the $j^{th}$ array in the N arrays being obtained based on the real-time active power of the s sample inverters.

18. The photovoltaic station according to claim 17, further comprising an array controller, configured to:
obtain average active power of the $j^{th}$ array based on the real-time active power of the s sample inverters; and
obtain the available active capacity of the $j^{th}$ array based on the average active power of the $j^{th}$ array and n.

19. The photovoltaic station according to claim 17, further comprising the array controller configured to obtain the available reactive capacity of the $j^{th}$ array based on the real-time active power of the s sample inverters, a maximum apparent power of the sample inverter, and n.

20. The photovoltaic station according to claim 17, wherein the station controller is configured to:
  when a total available reactive capacity of the N arrays is greater than or equal to the target reactive power, and a total available reactive capacity of the arrays of the first priority is less than the target reactive power, perform full-amount allocation on the arrays of the first priority based on available reactive capacities of the arrays, and allocate reactive power of the target reactive power that remains after allocation is performed on the first priority, to the arrays of the second priority based on ratios of available reactive capacities of the arrays to a total available reactive capacity of the arrays of the second priority.

21. The photovoltaic station according to claim 17, wherein the station controller is configured to: when a total available active capacity of the N arrays is greater than or equal to the target active power, and a total available active capacity of the arrays of the first priority is greater than or equal to the target active power, allocate the target active power to the arrays of the first priority based on ratios of available active capacities of the arrays to the total available active capacity of the arrays of the first priority.

22. The photovoltaic station according to claim 17, wherein the station controller is configured to:
  when a total available active capacity of the N arrays is greater than or equal to the target active power, and a total available active capacity of the arrays of the first priority is less than the target active power, perform the full-amount allocation on the arrays of the first priority based on available active capacities of the arrays, and allocate active power of the target active power that remains after allocation is performed on the first priority, to the arrays of the second priority based on ratios of available active capacities of the arrays to a total available active capacity of the arrays of the second priority.

23. The photovoltaic station according to claim 17, wherein the station controller is configured to:
  when a total available active capacity of the N arrays is less than the target active power, perform the full-amount allocation based on the available active capacities corresponding to the N arrays.

24. The photovoltaic station according to claim 17, wherein the station controller is configured to:
  when the total available reactive capacity of the arrays of the first priority is less than the target reactive power, first perform full-amount allocation based on the available reactive capacities corresponding to the N arrays, and then allocate reactive power in descending order of power factors of the N arrays, until all the target reactive power is allocated.

25. The photovoltaic station according to claim 24, wherein the station controller is configured to:
  obtain an updated available active capacity of the $j^{th}$ array based on allocated reactive power of the $j^{th}$ array in the N arrays and a maximum apparent power of the $j^{th}$ array; and
  when an updated total available active capacity of the N arrays is greater than or equal to the target active power, and an updated total available active capacity of the arrays of the first priority is greater than or equal to the target active power, allocate the target active power to the arrays of the first priority based on ratios of updated available active capacities of the arrays to the updated total available active capacity of the arrays of the first priority.

26. The photovoltaic station according to claim 24, wherein the station controller is configured to:
  when an updated total available active capacity of the N arrays is greater than or equal to the target active power, and an updated total available active capacity of the arrays of the first priority is less than the target active power, perform full-amount allocation on the arrays of the first priority based on updated available active capacities of the arrays, and allocate active power of the target active power that remains after allocation is performed on the first priority, to the arrays of the second priority based on ratios of updated available active capacities of the arrays to an updated total available active capacity of the arrays of the second priority.

27. The photovoltaic station according to claim 24, wherein the station controller is configured to:
  when an updated total available active capacity of the N arrays is less than the target active power, perform the full-amount allocation based on updated available active capacities corresponding to the N arrays.

28. The photovoltaic station according to claim 17, wherein the station controller is configured to:
  when a total available active capacity of the N arrays is greater than or equal to the target active power, allocate the target active power to the N arrays based on ratios of the available active capacities of the arrays to the total available active capacity of the N arrays; or
  when the total available active capacity of the N arrays is less than the target active power, perform the full-amount allocation based on the available active capacities corresponding to the N arrays.

29. The photovoltaic station according to claim 28, wherein the station controller is configured to:
  when a total available reactive capacity of the N arrays is greater than or equal to the target reactive power, allocate the target reactive power to the N arrays based on ratios of the available reactive capacities of the arrays to the total available reactive capacity of the N arrays; or
  when the total available reactive capacity of the N arrays is less than the target reactive power, perform the full-amount allocation based on the available reactive capacities corresponding to the N arrays.

30. The photovoltaic station according to claim 17, wherein the station controller is configured to:
  when a total available reactive capacity of the N arrays is less than the target reactive power, first perform full-amount allocation based on the available reactive capacities corresponding to the N arrays, and then allocate the reactive power in descending order of power factors of the N arrays, until all the target reactive power is allocated, wherein allocated reactive power of each array of the N arrays is less than or equal to maximum apparent power of the array; or
  when a total available reactive capacity of the N arrays is greater than or equal to the target reactive power, allocate the target active power to the N arrays based on ratios of the available reactive capacities of the arrays to the total available reactive capacity of the N arrays.

31. The photovoltaic station according to claim 17, further comprising the array controller configured to:
  when a $j^{th}$ available reactive power of the $j^{th}$ array is greater than or equal to a $j^{th}$ allocated reactive power of the $j^{th}$ array, allocate the reactive power to an $i^{th}$ inverter in the $j^{th}$ array based on a ratio of an available reactive capacity of the $i^{th}$ inverter to a total available reactive capacity of the $j^{th}$ array, wherein i=1, 2, . . . , n.

32. The photovoltaic station according to claim 17, further comprising the array controller, configured to:
when a $j^{th}$ available active power of the $j^{th}$ array is greater than or equal to a $j^{th}$ allocated active power of the $j^{th}$ array, allocate the active power to the $i^{th}$ inverter in the $j^{th}$ array based on a ratio of an available active capacity of the $i^{th}$ inverter to a total available active capacity of the $j^{th}$ array, wherein i=1, 2, . . . , n.

\* \* \* \* \*